US012804572B2

(12) United States Patent
Wong et al.

(10) Patent No.: US 12,804,572 B2
(45) Date of Patent: Nov. 17, 2026

(54) METHODS, COMMUNICATIONS DEVICES, AND INFRASTRUCTURE EQUIPMENT

(71) Applicant: Sony Group Corporation, Tokyo (JP)

(72) Inventors: Shin Horng Wong, Basingstoke (GB); Martin Warwick Beale, Basingstoke (GB); Samuel Asangbeng Atungsiri, Basingstoke (GB); Vivek Sharma, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 311 days.

(21) Appl. No.: 18/277,389

(22) PCT Filed: Mar. 18, 2022

(86) PCT No.: PCT/EP2022/057250

§ 371 (c)(1),
(2) Date: Aug. 16, 2023

(87) PCT Pub. No.: WO2022/207370

PCT Pub. Date: Oct. 6, 2022

(65) Prior Publication Data

US 2024/0129872 A1 Apr. 18, 2024

(30) Foreign Application Priority Data

Mar. 31, 2021 (EP) .................................... 21166489

(51) Int. Cl.
*H04W 56/00* (2009.01)

(52) U.S. Cl.
CPC ............................... *H04W 56/0045* (2013.01)

(58) Field of Classification Search
None
See application file for complete search history.

(56) References Cited

U.S. PATENT DOCUMENTS 12,557,049 B1 * 2/2026 Rofougaran ...... H04W 56/0015
2004/0249837 A1 * 12/2004 Yagi ...................... A63F 13/352
(Continued)

FOREIGN PATENT DOCUMENTS

WO 2021/197605 A1 10/2021
WO 2022/152631 A1 7/2022

OTHER PUBLICATIONS

International Search Report and Written Opinion mailed on Jul. 11, 2022, received for PCT Application PCT/EP2022/057250 filed on Mar. 18, 2022, 12 pages.
(Continued)

*Primary Examiner* — Wutchung Chu
*Assistant Examiner* — Berhanu D Belete
(74) *Attorney, Agent, or Firm* — XSENSUS LLP

(57) ABSTRACT

A method of operating an infrastructure equipment of a wireless communications network, the method comprising determining a reference time at which a timing advance estimate is to be valid; estimating, before the reference time, a timing advance which is valid for a transmission by a communications device at the reference time; and transmitting a timing advance indication to the communications device indicating the timing advance which is valid for a transmission by the communications device at the reference time.

20 Claims, 13 Drawing Sheets

(56) References Cited

U.S. PATENT DOCUMENTS

| | | | | |
|---|---|---|---|---|
| 2005/0280576 | A1* | 12/2005 | Shemesh | G01S 19/34<br>342/464 |
| 2006/0261589 | A1* | 11/2006 | Tanaka | B60R 22/02<br>242/390.8 |
| 2012/0072576 | A1* | 3/2012 | Yumerefendi | G06F 11/3476<br>709/224 |
| 2014/0226640 | A1* | 8/2014 | Zhu | H04L 5/0028<br>370/336 |
| 2018/0375722 | A1* | 12/2018 | Gohary | H04W 16/28 |
| 2020/0107283 | A1* | 4/2020 | Ratasuk | H04L 27/2646 |
| 2021/0297976 | A1* | 9/2021 | Medina Acosta | H04W 56/003 |
| 2021/0345272 | A1* | 11/2021 | Chatterjee | H04W 56/0015 |
| 2021/0410093 | A1* | 12/2021 | Ren | H04L 5/0051 |
| 2022/0150858 | A1* | 5/2022 | Ren | H04B 17/104 |
| 2022/0386262 | A1* | 12/2022 | Liberg | G01S 5/0236 |
| 2025/0031160 | A1* | 1/2025 | Xu | H04W 56/001 |

OTHER PUBLICATIONS

3GPP, Solutions for NR to support non-terrestrial networks (NTN) (Release 16), 3GPP TR 38.821 V16.0.0, Dec. 2019, pp. 1-140.

Holma et al., "LTE for UMTS OFDMA and SC-FDMA Based Radio Access", John Wiley & Sons, 2009, 450 pages.

Mediatek et al., "UL Time and Frequency Synchronisation for NR-NTN", 3GPP TSG RAN WG1 Meeting #102e, R1-2005496, Aug. 24-28, 2020, 14 pages.

Mediatek Inc., "New Study WID on NB-IoT/eTMC support for NTN", 3GPP TSG RAN Meeting #86, RP-193235, Dec. 9-31, 2019, 4 pages.

3GPP, "Study on New Radio (NR) to support non-terrestrial networks (Release 15)", 3GPP TR 38.811 V15.4.0, Sep. 2020, pp. 1-127.

ZTE Corporation et al., "Consideration on Random Access for NTN", 3GPP TSG-RAN WG2 #105 Meeting, R2-1900576, Feb. 25-Mar. 1, 2019, 8 pages.

* cited by examiner

METHODS, COMMUNICATIONS DEVICES, AND INFRASTRUCTURE EQUIPMENT

CROSS-REFERENCE TO RELATED APPLICATIONS

The present application is based on PCT filing PCT/EP2022/057250, filed Mar. 18, 2022, which claims priority to European Patent Application No. 21166489.1, filed Mar. 31, 2021, the contents of each are hereby incorporated by reference.

BACKGROUND

Field of Disclosure

The present disclosure relates generally to wireless communications networks, and specifically to methods and devices for transmitting signals via a wireless communications link having a variable propagation delay.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these and future networks, i.e. geographic locations where access to the networks is possible, may be expected to increase ever more rapidly.

Current and future wireless communications networks are expected to routinely and efficiently support communications with a wider range of devices associated with a wider range of data traffic profiles and types than previously developed systems are optimised to support. For example it is expected that future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for more advanced wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

One example area of current interest in this regard includes so-called "non-terrestrial networks", or NTN for short. 3GPP has proposed in Release 15 of the 3GPP specifications to develop technologies for providing coverage by means of one or more antennas mounted on airborne or space-borne vehicles [1].

Non-terrestrial networks may provide service in areas that cannot be covered by terrestrial cellular networks (i.e. those where coverage is provided by means of land-based antennas), such as isolated or remote areas, on board aircraft or vessels) or may provide enhanced service in other areas. The expanded coverage that may be achieved by means of non-terrestrial networks may provide service continuity for machine-to-machine (M2M) or 'internet of things' (IoT) devices, or for passengers on board moving platforms (e.g. passenger vehicles such as aircraft, ships, high speed trains, or buses). Other benefits may arise from the use of non-terrestrial networks for providing multicast/broadcast resources for data delivery.

The use of different types of network infrastructure equipment and requirements for coverage enhancement give rise to new challenges for efficiently handling communications in wireless communications systems that need to be addressed.

In particular, where wireless communications occur via communications links which may have varying propagation delays, there is a need to ensure that transmissions occur at an appropriate time, taking into account any applicable propagation delay.

SUMMARY OF THE DISCLOSURE

The present disclosure can help address or mitigate at least some of the issues discussed above.

Embodiments of the present technique can provide a method of operating an infrastructure equipment of a wireless communications network. The method comprises determining a reference time at which a timing advance estimate is to be valid, estimating, before the reference time, a timing advance which is valid for a transmission by a communications device at the reference time, and transmitting a timing advance indication to the communications device indicating the timing advance which is valid for a transmission by the communications device at the reference time.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution Advanced Radio Access Technology (4G)

Figure 1:
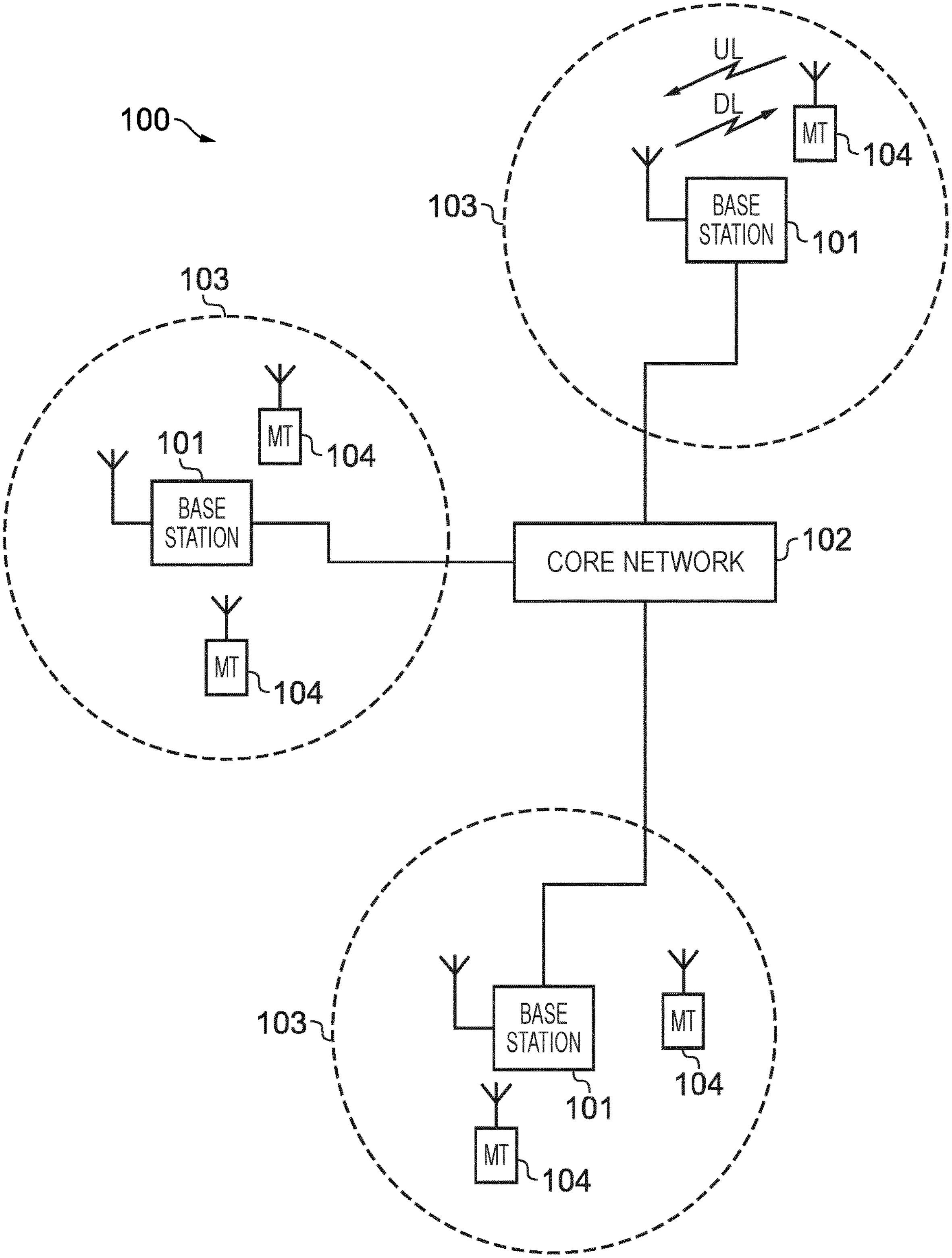
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink. Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, terminal devices, and so forth. Base stations, which are an example of network infrastructure equipment/network access nodes, may also be referred to as transceiver stations/nodeBs/e-nodeBs (eNB), g-nodeBs (gNB) and so forth. In this regard, different terminology is often associated with different generations of wireless telecommunications systems for elements providing broadly comparable functionality. However, example embodiments of the disclosure may be equally implemented in different generations of wireless telecommunications systems such as 5G or new radio as explained below, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G NR)

Figure 2:
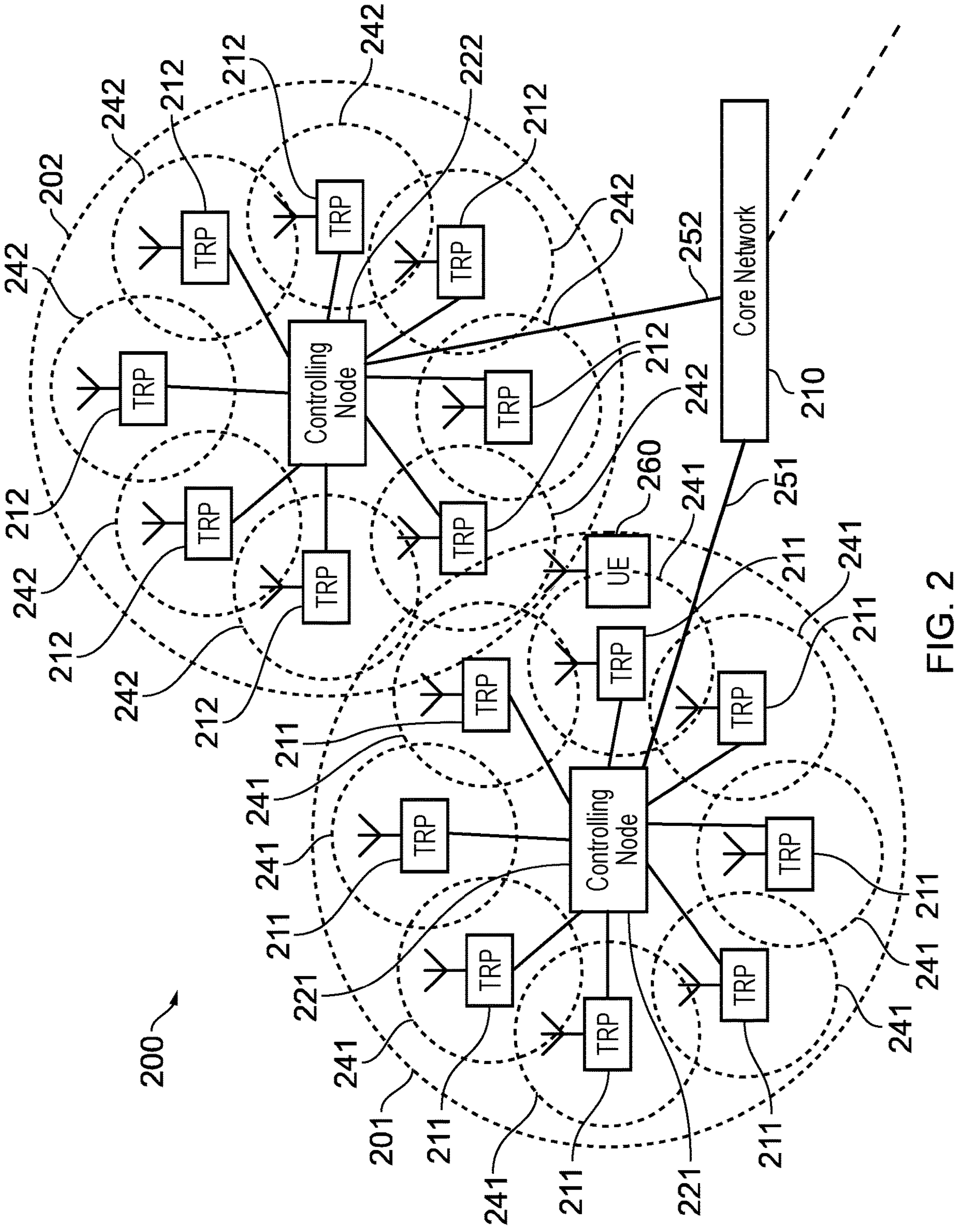
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/remote transmission and reception points (TRPs)) 211, 212 in their respective cells. Again, these communications may be over respective wired or wireless links. The distributed units (DUs) 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases communications for a given communications device are routed through only one of the distributed units, but it will be appreciated in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein.

In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Figure 3:
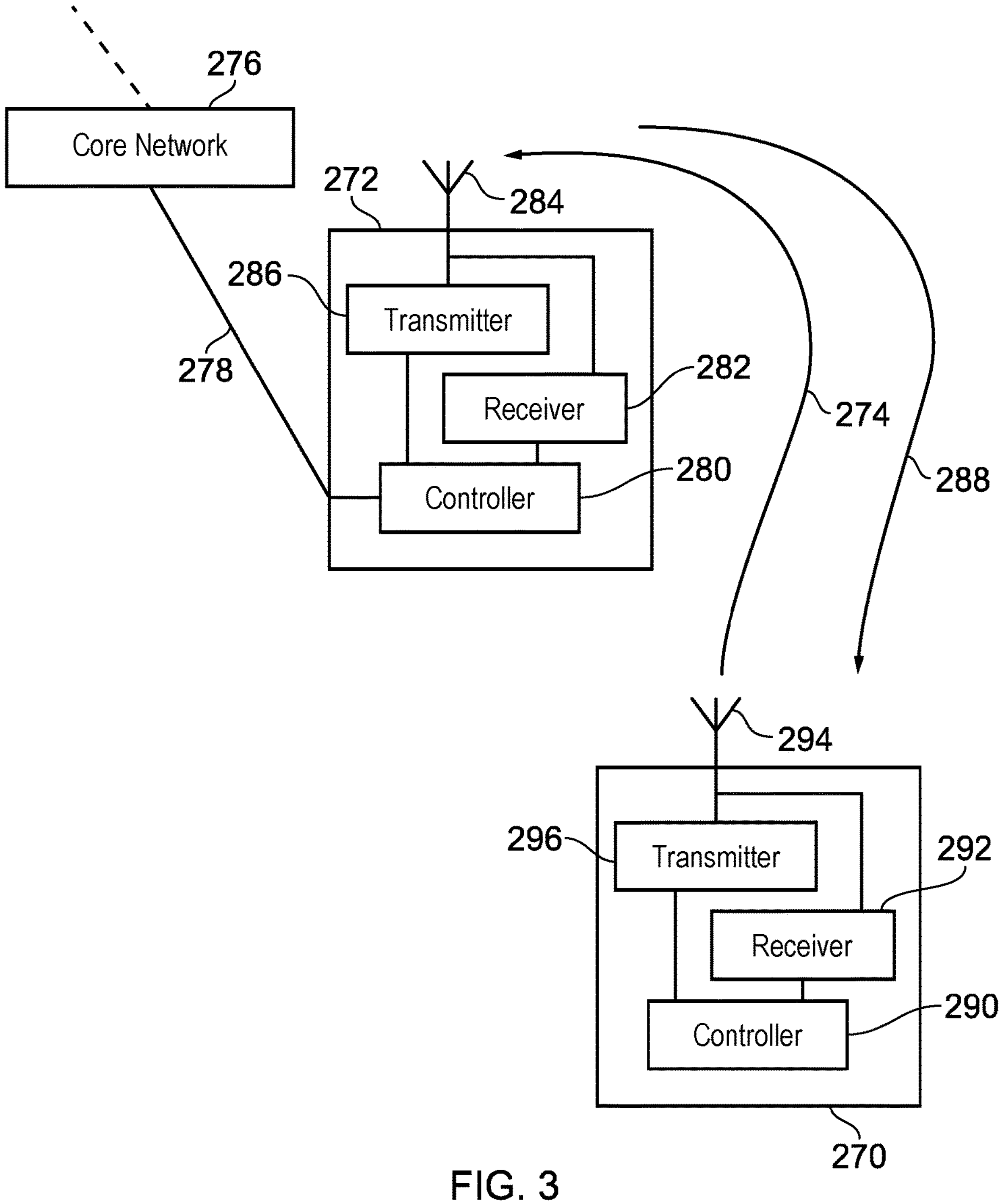
FIG. 3 is a schematic block diagram of an example infrastructure equipment and communications device configured in accordance with example embodiments.

A more detailed illustration of a communications device 270 and an example network infrastructure equipment 272, which may be thought of as an eNB or a gNB 101 or a combination of a controlling node 221 and TRP 211, is presented in FIG. 3. As shown in FIG. 3, the communications device 270 is shown to transmit uplink data to the infrastructure equipment 272 of a wireless access interface as illustrated generally by an arrow 274. The UE 270 is shown to receive downlink data transmitted by the infrastructure equipment 272 via resources of the wireless access interface as illustrated generally by an arrow 288. As with FIGS. 1 and 2, the infrastructure equipment 272 is connected to a core network 276 (which may correspond to the core network 102 of FIG. 1 or the core network 210 of FIG. 2) via an interface 278 to a controller 280 of the infrastructure equipment 272. The infrastructure equipment 272 may additionally be connected to other similar infrastructure equipment by means of an inter-radio access network node interface, not shown on FIG. 3.

The infrastructure equipment 272 includes a receiver 282 connected to an antenna 284 and a transmitter 286 connected to the antenna 284. Correspondingly, the communications device 270 includes a controller 290 connected to a receiver 292 which receives signals from an antenna 294 and a transmitter 296 also connected to the antenna 294.

The controller 280 is configured to control the infrastructure equipment 272 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications systems. The transmitter 286 and the receiver 282 may comprise signal processing and radio frequency filters, amplifiers and circuitry in accordance with conventional arrangements. The transmitter 286, the receiver 282 and the controller 280 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 272 will in general comprise various other elements associated with its operating functionality.

Correspondingly, the controller 290 of the communications device 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 270 will in general comprise various other elements associated with its operating functionality, for example a power source, user interface, and so forth, but these are not shown in FIG. 3 in the interests of simplicity.

The controllers 280, 290 may be configured to carry out instructions which are stored on a computer readable medium, such as a non-volatile memory. The processing steps described herein may be carried out by, for example, a microprocessor in conjunction with a random access memory, which may be non-volatile memory, operating according to instructions stored on a computer readable medium.

Non-Terrestrial Networks (NTNs)

Figure 5:
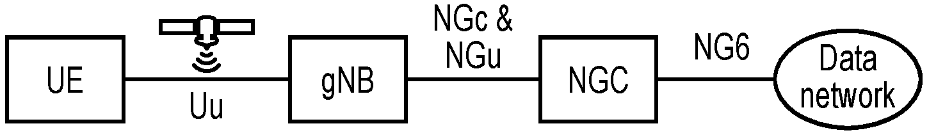
FIG. 5 is reproduced from [1], and illustrates a first example of an NTN featuring an access networking service based on a non-terrestrial infrastructure equipment operating in a transparent mode.
Figure 6:
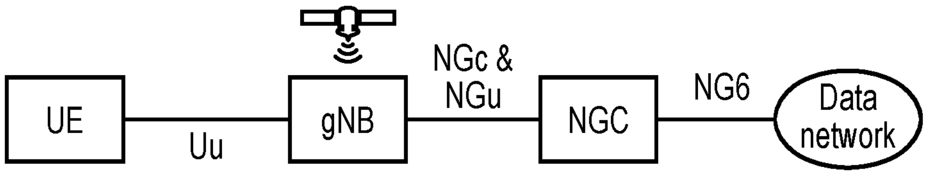
FIG. 6 is reproduced from [1], and illustrates a second example of an NTN featuring an access networking service based on a non-terrestrial infrastructure equipment having some functionality of a base station.

An overview of NR-NTN can be found in Pi, and much of the following wording, along with FIG. 5 and FIG. 6, has been reproduced from that document as a way of background.

In an NTN, non-terrestrial network part (such as a satellite or aerial platform) may allow a connection of a communications device and a ground station (which may be referred to herein as an NTN gateway). In the present disclosure, the term non-terrestrial network part is used to refer to a space vehicle, aerial platform, or satellite, or any other entity which moves relative to a communications device and is configured to communicate with the communications device. In particular, a non-terrestrial network part may be in some embodiments a low earth orbit (LEO) satellite, a medium earth orbit (MEO) satellite, a geo-stationary earth orbit (GEO) satellite, a high altitude platform system (HAPS), a balloon or a drone for example.

As a result of the wide service coverage capabilities and reduced vulnerability of satellites to physical attacks and natural disasters, Non-Terrestrial Networks may:

- foster the roll out of wireless communications service (such as a 5G service) in un-served areas that cannot be covered by terrestrial cellular network (isolated/remote areas, on board aircrafts or vessels) and underserved areas (e.g. sub-urban/rural areas);
- complement terrestrial networks in cost effective manner;
- enhance the service reliability available to a communications device by providing service continuity, for example for M2M/IoT devices or for passengers on board moving platforms (e.g. passenger vehicles-aircraft, ships, high speed trains, bus) or
- ensuring service availability anywhere, especially for critical communications, future railway/maritime/aeronautical communications; and to
- enable 5G network scalability by providing efficient multicast/broadcast resources for data delivery towards the network edges or even user terminal.

The benefits relate to either Non-Terrestrial Networks operating alone or to integrated terrestrial and Non-Terrestrial networks. They will impact at least coverage, user bandwidth, system capacity, service reliability or service availability, energy consumption and connection density. For example, a role for Non-Terrestrial Network components in the 5G system is expected for at least the following verticals: transport, Public Safety, Media and Entertainment, eHealth, Energy, Agriculture, Finance and Automotive. It should also be noted that the same NTN benefits can apply to other present and future technologies such as 4G and/or LTE technologies. The teachings and techniques presented herein are equally applicable to other technologies such as 4G and/or LTE.

Figure 4:
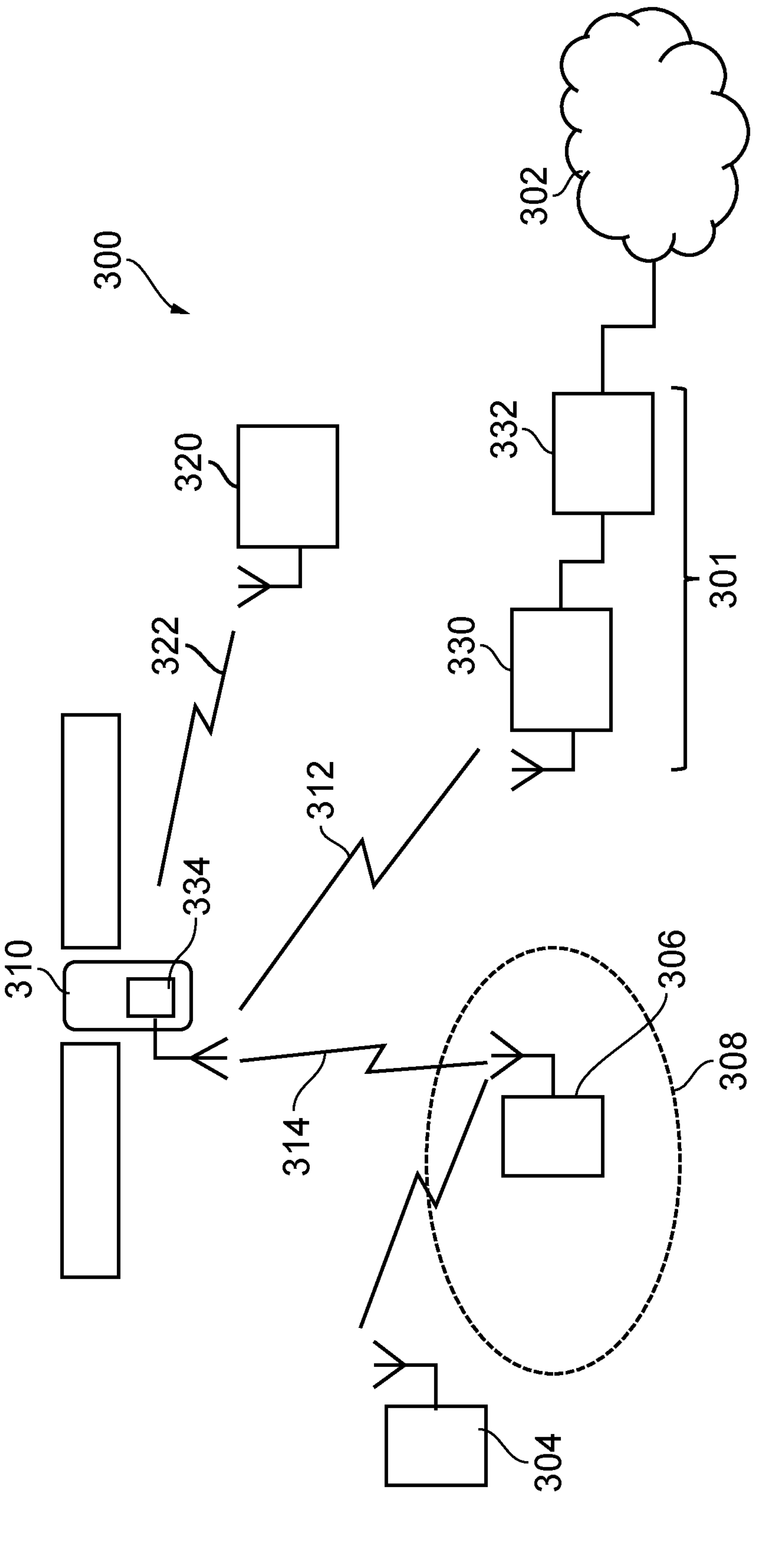
FIG. 4 schematically shows an example of a wireless communications system, comprising a non-terrestrial network (NTN) part, which may be configured to operate in accordance with embodiments of the present disclosure.

FIG. 4 schematically shows an example of a wireless communications system 300 which may be configured to operate in accordance with embodiments of the present disclosure. The wireless communications system 300 in this example is based broadly around an LTE-type or 5G-type architecture. Many aspects of the operation of the wireless communications system/network 300 are known and understood and are not described here in detail in the interest of brevity. Operational aspects of the wireless communications system 300 which are not specifically described herein may be implemented in accordance with any known techniques, for example according to the current LTE standards or the current 5G standards.

The wireless communications system 300 comprises a core network part 302 (which may be, for example, a 4G core network or a 5G core network) in communicative connection with a radio network part 301, which is an example of infrastructure equipment. The radio network part 301 comprises a base station 332 connected to a ground station (or NTN gateway) 330. The radio network part 301 may perform the functions of a base station 101 of FIG. 1, or may perform the functions of a controlling node and TRP of FIG. 2.

A non-terrestrial network part 310 may comprise, or may be co-located with non-terrestrial infrastructure equipment 334. For example, the non-terrestrial infrastructure equipment 334 may be mounted on, and/or within the non-terrestrial network part 310. The non-terrestrial infrastructure equipment 334 communicates via the ground station 330 with the base station 332 via a wireless communications link 312.

The non-terrestrial infrastructure equipment 334 may communicate with a communications device 306, located within a cell 308, by means of a wireless access interface providing a wireless communications link 314. The cell 308 may correspond to the coverage area of a spot beam generated by the non-terrestrial infrastructure equipment 334. The boundary of the cell 308 may depend on an altitude of the non-terrestrial network part 310 and a configuration of one or more antennas of the non-terrestrial infrastructure equipment 334 by which the non-terrestrial infrastructure equipment 334 transmits and receives signals on the wireless access interface.

The non-terrestrial network part 310 may be a satellite in an orbit with respect to the Earth. For example, the satellite may be in a geo-stationary earth orbit (GEO) such that the non-terrestrial network part 310 does not move with respect to a fixed point on the Earth's surface. The geo-stationary earth orbit may be approximately 36,786 km above the Earth's equator. Alternatively, the satellite may be in a non-geostationary orbit (NGSO), so that the non-terrestrial network part 310 moves with respect to a fixed point on the Earth's surface. An example of an NGSO is a low-earth orbit (LEO), in which the non-terrestrial network part 310 may complete an orbit of the Earth relatively quickly, thus providing moving cell coverage.

In FIG. 4, the ground station 330 is connected to the non-terrestrial infrastructure equipment 334 by means of the wireless communications link 312. The non-terrestrial infrastructure equipment 334 receives signals representing downlink data generated by the radio access network 301 on the wireless communications link 312 and, based on the received signals, transmits signals representing the downlink data via the wireless communications link 314 to the communications device 306. Similarly, the non-terrestrial infrastructure equipment 334 receives signals representing uplink data transmitted by the communications device 306 via the wireless communications link 314 and transmits signals representing the uplink data to the ground station on the wireless communications link 312. The wireless communications links 314, 312 may operate at a same frequency, or may operate at different frequencies.

In some cases, the non-terrestrial network part 310 and/or the non-terrestrial infrastructure equipment 334 is also connected to a ground station 320 via a wireless link 322. The ground station may for example be operated by an operator of the non-terrestrial network part 310 (which may be the same as the mobile operator for the core and/or radio network, or may be a different operator) and the link 322 may be used as a management link and/or to exchange control information. The non-terrestrial network part 310 may determine its current position and velocity, which can be transmitted to the ground station 320. The position and velocity information may be shared as appropriate, e.g. with one or more of the communications device 306, radio network part 301, for configuring the wireless communication accordingly (e.g. via links 312 and/or 314).

The extent to which the non-terrestrial network part 310 processes received signals may depend upon a processing capability or mode of operation of the non-terrestrial network part 310. For example, the non-terrestrial network part 310 may receive signals representing the downlink data on the wireless communication link 312, amplify them and (if needed) re-modulate onto an appropriate carrier frequency for onwards transmission on the wireless access interface providing the wireless communications link 314.

FIG. 5 illustrates an example of an NTN architecture based on a non-terrestrial infrastructure equipment operating in a transparent manner, meaning that a signal received from the communications device at the non-terrestrial infrastructure equipment is forwarded (to a ground station on Earth or to another non-terrestrial network part) with only frequency conversion and/or amplification. A wireless access interface (such as a 5G Uu interface) may be generated at a base station located on the Earth, and connects the base station (gNB, in the example of FIG. 4) and the communications device (UE).

Alternatively, the non-terrestrial network part 310 may be configured to decode the signals representing the downlink data received on the wireless communication link 312 into un-encoded downlink data, re-encode the downlink data and modulate the encoded downlink data onto the appropriate carrier frequency for onwards transmission on the wireless access interface provided by the wireless communications link 314.

The non-terrestrial infrastructure equipment 334 may be configured to perform some of the functionality conventionally carried out by a base station (e.g. a gNodeB or an eNodeB), such as base station 101 as shown in FIG. 1. In particular, latency-sensitive functionality (such as acknowledging a receipt of the uplink data, or responding to a RACH request) may be performed by the non-terrestrial infrastructure equipment 334 partially implementing some of the functions of a base station. Accordingly, it will be appreciated that some or all of the steps described herein as being performed by a base station or infrastructure equipment may be performed by non-terrestrial infrastructure equipment and/or a ground station. Similarly, some or all features disclosed as being part of a base station or infrastructure equipment may be located in non-terrestrial infrastructure equipment or in a ground station.

In such arrangements, a wireless communications feeder link between the non-terrestrial infrastructure equipment 334 and a ground station (such as ground station 330 may provide connectivity between the non-terrestrial infrastructure equipment 334 and the core network part 302. In such arrangements, the base station 332 may not be present.

FIG. 6 illustrates an example of an NTN architecture based on a satellite comprising at least some base station functionality which may be an example of non-terrestrial infrastructure equipment. In this example NTN, the satellite (non-terrestrial infrastructure equipment) generates the wireless access interface (e.g. the Uu interface) which connects the satellite and the user equipment. For example, the satellite may decode a received signal, and encode and generate a transmitted signal. As such, the satellite may include some or all of the functionality of a base station (such as a gNodeB or eNodeB). A further connection between the satellite and a ground station (such as an NTN gateway) may be by means of a separate wireless access interface, and may form part of a connection between the satellite and a core network. The satellite in the example of FIG. 6 may be described herein as operating in an 'infrastructure' or 'regenerative' mode of operation [3].

In some cases, the communications device 306 shown in FIG. 4 may be configured to act as a relay node. That is, it may provide connectivity to one or more terminal devices such as the terminal device 304. When acting as a relay node, the communications device 306 transmits and receives data to and from the terminal device 304, and relays it, via the non-terrestrial network part 310 to the terrestrial station 301. The communications device 306, acting as a relay node, may thus provide connectivity to the core network part 65 for terminal devices which are within a transmission range of the communications device 306.

It will be apparent to those skilled in the art that many scenarios can be envisaged in which the combination of the communications device 306 and the non-terrestrial network part 310 can provide enhanced service to end users. For example, the communications device 306 may be mounted on a passenger vehicle such as a bus or train which travels through rural areas where coverage by terrestrial base stations may be limited. Terminal devices on the vehicle may obtain service via the communications device 306 acting as a relay, which communicates with the non-terrestrial infrastructure equipment 334.

Geolocation

In embodiments of the present technique, the communications device may be capable of determining its absolute location [1]. The present disclosure is not limited to a particular technique for location determination. An example of a suitable technique is a global navigation satellite system (GNSS) based technique. An example of a GNSS is the global positioning satellite (GPS) system.

A position and velocity of a satellite (whether part of a GNSS or a NTN satellite) may be derived from satellite ephemeris information, which describes the satellite orbital trajectory W. Ephemeris information may be broadcast to the communications device, for example in system information blocks (SIBs) of the wireless communications network. A satellite's position and velocity are also affected by perturbations in its orbit, which are not taken into account in the satellite ephemeris information [4]. An NTN satellite may signal its precise position and velocity to the NTN Gateway, and this information may be signaled to the communications device. This signalling may be within a SIB [4] or in downlink control information (DCI) such as that used for scheduling information relating to an uplink transmission [5].

Timings in NTN

In terrestrial networks (TN), the propagation delays between the communications device and the base station are very small: typically less than 1 ms. This delay can be mitigated by using a timing advance (TA) mechanism.

Additionally or alternatively, on an OFDM-based wireless access interface a cyclic prefix can be applied to each OFDM symbol.

The principles of a timing advance are illustrated in FIG. 7 and will be briefly described.

Figure 7A:
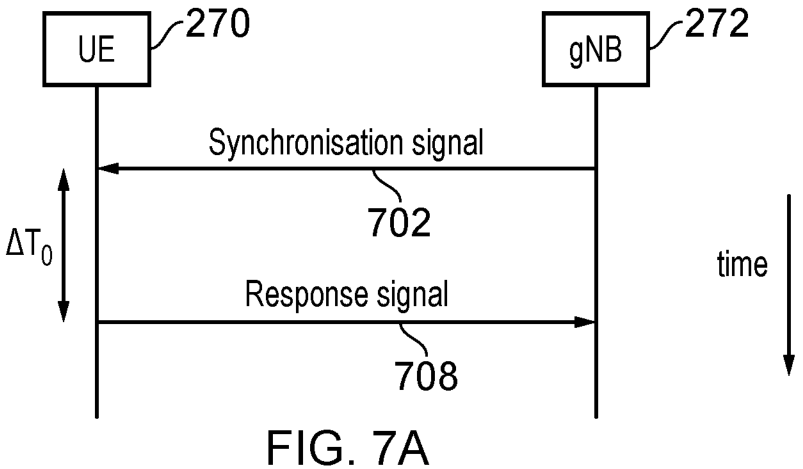
FIG. 7A, FIG. 7B and FIG. 7C illustrate the principles of a timing advance applied to wireless communications.

In FIG. 7A, there is no propagation delay between a base station (such as the base station 272 of FIG. 3) and a communications device (such as communications device 270 of FIG. 3). Accordingly, if the communications device 270 transmits a response signal 708 after a delay of time $\Delta T_0$ after receiving a synchronisation signal (or other suitable signal) 702 transmitted by the base station 272, the response signal 708 will be received at the base station 272 at time $\Delta T_0$ after the synchronisation signal 702 was transmitted.

Figure 7B:
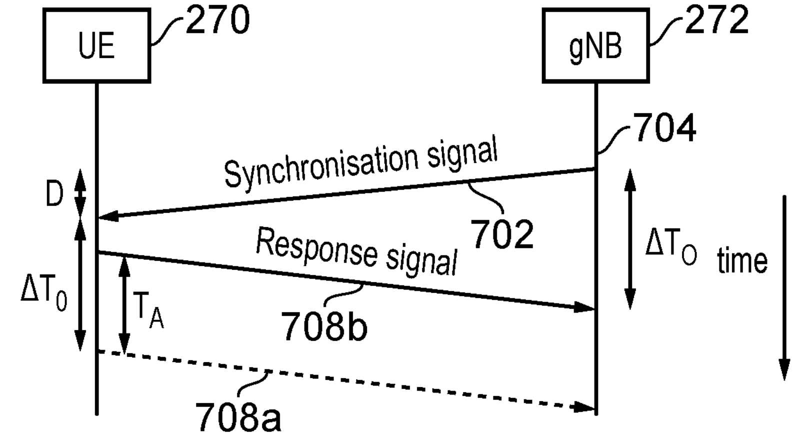

In the example of FIG. 7B, there is a propagation delay D which applies to signals transmitted between the base station 272 and the communications device 270. If, in this case, the communications device were to transmit a response signal 708*b* at time $\Delta T_0$ after receiving the synchronisation signal 702, then the response signal 708*a* would arrive 'late' at the base station 272. This is undesirable, as it increases complexity for the base station and may mean that it is received at the same time as another, interfering, signal transmitted by a different communications device.

In order to ensure that signals transmitted by the communications device 270 are received at the base station 272 at a predetermined time, relative to the base station's timebase 704, and irrespective of the propagation delay D between the base station and the communications device, the communications device may apply a timing advance $T_A$ to its transmitted signals. This means that response signals 708*b* are transmitted earlier in time, by an amount $T_A$ than would have been the case if no propagation delays were assumed. For example, in FIG. 7B, the response signals 708*b* are transmitted at time $(\Delta T_0 - T_A)$ after receiving the synchronisation signals, and are received at the base station 272 at the same time as if the propagation delay were zero. The timing advance $T_A$ may be equal to twice the propagation delay D.

Figure 7C:
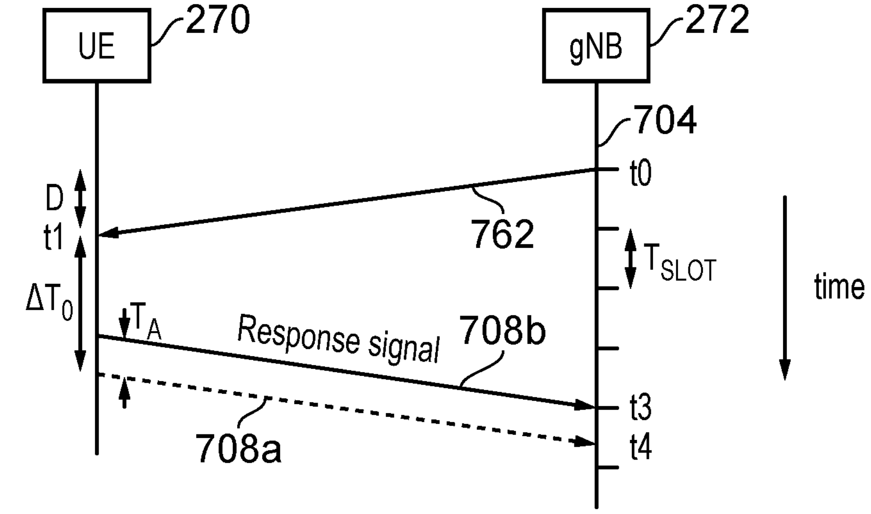

In some scenarios, the timing advance $T_A$ may compensate for a portion of the propagation delay, as shown in FIG. 7C. In the example of FIG. 7C, a signal 762 is transmitted by the base station 272 at time t0. As a result of the propagation delay, this is received at the communications device at time t1. If the communications device transmits signals 708*a* at a time $\Delta T_0$ after t1, they will be received at time t4. The base station 272 may be able to process these signals if they are received aligned with the base station's time base 704. For example, the base station 272 may be able to process these signals if they arrive at any time t where $t = t0 + n\ T_{SLOT}$. Accordingly, it is sufficient that the timing advance ensure that the signals transmitted by the communications device arrive at t3 (where $t3 = t0 + 3.\ T_{SLOT}$). Accordingly, the timing advance does not compensate for all of the propagation delay.

In general, the use of a timing advance can mitigate at least some of the effects of a propagation delay on the time of receipt, at a base station, of a signal transmitted by a communications device. In the examples of FIGS. 7A, 7B and 7C, the transmission time for signals if no timing advance is applied (referred to herein as the 'scheduled' transmission time) is determined based on a delay and a receipt of a synchronisation signal. However, the present disclosure is not so limited, and the scheduled transmission time may be determined in accordance with any suitable technique.

In a conventional terrestrial network, the timing advance ($T_A$) may be determined by a base station based on the communications device's uplink transmissions. The $T_A$ may be signaled to the communications device during a random access channel (RACH) process. Because cells are relatively small, and the relative distance between the base station and the communications device does not change rapidly, the $T_A$ may be updated relatively infrequently.

In accordance with some conventional techniques, such as for IoT-NTN, the communications device may be expected to estimate the $T_A$ based on a determination of its location and of the location of a non-terrestrial infrastructure equipment, which is enabling the communication with the base station.

It has been recognised that a large, and potentially rapid, variation in propagation delay may arise because of a change of distance over which signals are transmitted, resulting from movement of the communications device, the non-terrestrial infrastructure equipment, or both.

In an NTN, a particular problem arises because of the magnitude of the possible propagation delays, and also the rate at which a propagation delay can vary. For example, a satellite in low earth orbit (LEO) may be between 600 km and 1200 km away from the communications device.

When such a satellite is operating in transparent mode, the round trip time between a communications device and a base station may be approximately 8 ms to 25.77 ms [3]. A coverage region ('footprint') corresponding to a beam of the satellite may be very large, such that there can be a large variation of the propagation delay, depending on the location of the communications device within the satellite beam footprint.

A further technical issue arises if both a base station and communications device determine a TA. For example, it may be that an eNB in IoT-NTN will estimate a TA and transmit an indication of that TA to the UE. The UE may also independently determine a TA value.

In these and similar scenarios where a propagation delay can change rapidly during a time period between an estimation of a timing advance and a transmission of signals at a time determined based on the timing advance, there arises a technical problem of how a communications device should determine the actual TA to be applied to its uplink transmission(s).

According to embodiments of the present technique, there is provided a method of operating an infrastructure equipment of a wireless communications network, the method comprising determining a reference time at which a timing advance estimate is to be valid; estimating, before the reference time, a timing advance which is valid for a transmission by a communications device at the reference time; and transmitting a timing advance indication to the communications device indicating the timing advance which is valid for a transmission by the communications device at the reference time. Embodiments of the present technique can improve an accuracy of a timing advance (TA) determination, in particular when a propagation delay applicable to signals transmitted or received by the communications device can vary by a large amount and/or rapidly over time between a time of calculation or estimation of a timing advance, and the transmission of uplink signals, to which a timing advance is applied.

In some embodiments, the wireless communications network comprises a non-terrestrial infrastructure equipment, and transmitting the uplink data comprises transmitting signals representing the uplink data to the non-terrestrial infrastructure equipment, the non-terrestrial infrastructure equipment attached to, or forming a part of a satellite.

Embodiments of the present technique can therefore mitigate the rapid change in propagation delay over time, resulting from the motion of the satellite relative to the communications device.

According to embodiments of the present technique, there is provided a method of operating a communications device for transmitting signals representing uplink data to a wireless communications network via a wireless access interface, the method comprising determining a first time for transmitting the signals representing the uplink data to the wireless communications network, and transmitting at the first time on the wireless access interface the signals representing the uplink data, wherein determining the first time comprises receiving a timing advance indication comprising an indication of a first timing advance estimate valid at a first reference time, determining a second reference time at which a second timing advance estimate is to be valid, estimating, before the first time, the second timing advance valid for a transmission by the communications device at the second reference time, and determining the first time based on one or both of the first timing advance estimate and the second timing advance estimate.

Embodiments of the present technique can therefore improve an accuracy of a timing advance used for a transmission by determining a time for transmission based on one or both of a timing advance estimated at a base station and a timing advance estimated at the communications device.

Embodiments of the present technique can be applied whether the satellite is operating in a transparent mode of operation or in an infrastructure mode of operation. Embodiments of the present technique are not limited to scenarios including satellites, but may be more generally applicable in scenarios where there is a need to provide a high accuracy TA determination.

Reference Time

In accordance with embodiments of the present technique, a timing advance value which is determined by a base station or a communications device is associated with a ‘reference time’, $T_{REF}$, whereby the timing advance value is determined based on a determination (or estimation) of the propagation delay to which signals will be subjected if transmitted at the reference time.

At the communications device, a transmission time for uplink signals transmitted at time $T_{TX}$ may be based on the timing advance value, and the time $T_{REF}$. In some embodiments, $T_{TX}$ may be the scheduled transmission time, at which the signals would be transmitted if no timing advance is to be applied.

In some embodiments, the timing advance is determined at the base station and a timing advance indication, comprising an indication of the determined timing advance value, may be transmitted to the communications device. In such embodiments, the timing advance may be determined for a time $T_{REF}$ which is before the timing advance indication is transmitted. In some such embodiments, the timing advance may be determined for a time $T_{REF}$ which is after the timing advance indication is transmitted.

In some embodiments, the timing advance value is determined based on a measurement, such as a round-trip time measurement. This may be in accordance with a conventional RACH-based technique.

In some embodiments, where the timing advance value is determined based on a measurement, $T_{REF}$ may occur after the time of the measurement, and the base station may accordingly determine the timing advance value based on the result of the measurement and the time at which the measurement was made.

In some embodiments, where the non-terrestrial network part is a satellite, the base station may receive updated information indicating the position of the non-terrestrial network part which is more accurate than a position determination made solely based on ephemeris data. In some such embodiments, $T_{REF}$ may differ from the time at which the updated position data is valid, and the base station may accordingly determine the timing advance value based on the received updated position data and the time at which it was valid.

In some embodiments, the base station may receive information indicating the position of the communications device, which is valid at a particular time. In some such embodiments, $T_{REF}$ may differ from the time at which the communications device position data is valid, and the base station may accordingly determine the timing advance value based on the received communications device position data and the time at which it was valid. The communications device position data may be received from the communications device or from any other suitable entity, such as a location server within the core network.

In some embodiments the base station may determine, or estimate a propagation delay for signals representing the timing advance indication.

In some embodiments, $T_{REF}$ is defined relative to a time of reception of signals at the communications device. For example, $T_{REF}$ may be defined as the time of reception of signals conveying the timing advance indication. In some such embodiments, the base station may determine, or estimate a propagation delay for these signals, and may accordingly determine the time $T_{REF}$ based on the scheduled time of transmission of the signals and the propagation delay.

In some embodiments, the time $T_{REF}$ is the time at which the timing advance indication is received by the communications device. Accordingly, when the timing advance value is calculated by the base station, it may be based on a determination of the location of the satellite, at the time $T_{REF}$, which is in the future.

Figure 8:
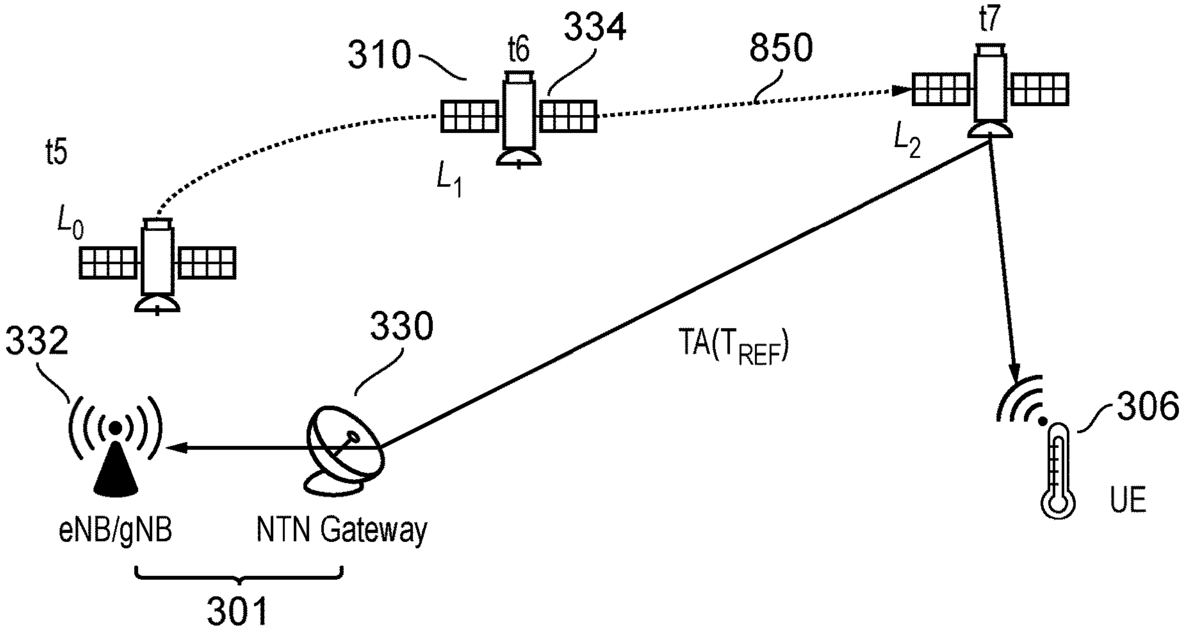
FIG. 8 and FIG. 9 show an example of the transmission of uplink data by a communications device in accordance with embodiments of the present technique.
Figure 9:
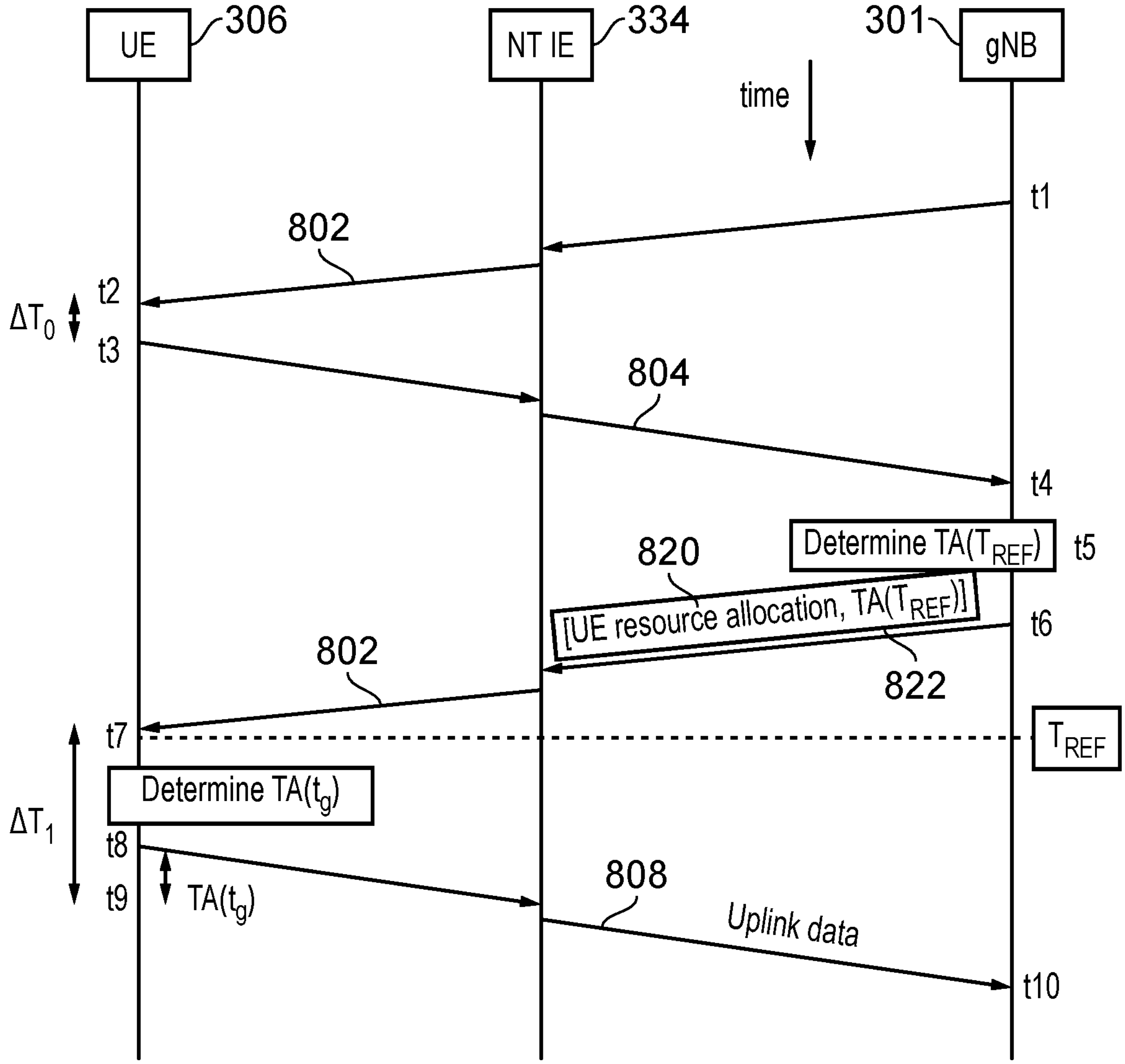

FIG. 8 and FIG. 9 show an example of the transmission of uplink data by a communications device (which may be the communications device 306 of FIG. 4) in accordance with embodiments of the present technique.

In the example of FIG. 8 and FIG. 9, the communications device 306 obtains service from a base station (which may be the radio access network 301 of FIG. 4) via a non-terrestrial infrastructure equipment (which may be the non-terrestrial infrastructure equipment 334 of FIG. 4). The non-terrestrial infrastructure equipment 334 is mounted on, or forms part of a satellite non-terrestrial network part 310.

A portion of the path of the non-terrestrial network part 310 is shown in FIG. 9, indicated by the dashed arrow 850.

In FIG. 9, time flows from top to bottom. It will be appreciated that the non-terrestrial infrastructure equipment 334 and/or communications device 306 may move (in absolute terms, and/or relative to each other) during the time period shown in FIG. 9, however this is not shown in FIG. 9.

At time t1, the base station 301 transmits a synchronisation signal 802, which is received at the communications device at time t2. The synchronisation signal may be specific to the communications device or may be broadcast.

At time t3, the communications device transmits a response signal 804 (which may be a RACH transmission).

Time t3 occurs $\Delta T_0$ after time t2, where $\Delta T_0$ is known by (or can be determined by) the base station. Accordingly, when the base station receives the response signal 804 at time t4, it is able to determine a measurement value for the round trip time as (t4−t1−$\Delta T_0$).

At time t5, the base station allocates communication resources which start (with reference to the base station's timebase) at time t10, and determines the timing advance value which is valid at a future time $T_{REF}$. At time t5, the non-terrestrial network part 310 is at position $L_0$, as shown in FIG. 8.

In the example of FIG. 9, $T_{REF}$ is equal to the time at which the communications device receives a timing advance indication 822 which indicates the timing advance at time $T_{REF}$. The base station determines that this indication will be transmitted starting at time t6, determines (or estimates) the propagation delay applicable to the transmission at time t6, and accordingly determines $T_{REF}$ as being time t7.

The base station then determines the timing advance value which corresponds to the round trip time for signals transmitted by the communications device at time $T_{REF}$. This may be based on the measurement of the round trip time. Additionally or alternatively, if the non-terrestrial infrastructure equipment 334 is mounted on, or co-located with a satellite non-terrestrial network part, $T_{REF}$ may be determined based on ephemeris information associated with the satellite, which indicates that at time t7, the location of the satellite will be $L_2$, as shown in FIG. 8.

In the example of FIG. 9, the determination of the timing advance value by the base station is based on a combination of a round-trip time measurement and satellite ephemeris information. Specifically, in addition to the measurement of the round-trip time based on the synchronisation signal 802 and response signal 804, an estimate of the round-trip time at t4 is determined based on the ephemeris data (i.e. based on the location of the satellite at time t4, as determined by the ephemeris data). The difference between this estimated round-trip time and the measured round-trip time is calculated to determine an offset.

In the example of FIG. 9, the round-trip time at $T_{REF}$ is also calculated based on the satellite ephemeris data, from which the location of the satellite at time $T_{REF}$ is determined. The resulting value is used to determine TA($T_{REF}$), the timing advance value valid at $T_{REF}$.

Accordingly, by using the combination of measurement information and ephemeris data, a more accurate estimation of the round-trip time is possible. In some embodiments, the location and/or motion of the communications device is also taken into account.

However, the present disclosure is not so limited, and any suitable method may be used to determine TA($T_{REF}$).

At time t6, the base station transmits a message 806 comprising the resource allocation indication 820 and a timing advance indication 822. At time t6, the non-terrestrial network part 310 is at position $L_1$, as shown in FIG. 8.

The message 806 is received at the communications device at time t7. The timing advance indication 822 indicates the value of TA($T_{REF}$). At time t7, the non-terrestrial network part 310 is at position $L_2$, as shown in FIG. 8.

Based on the resource allocation indication 820, the communications device determines a time offset $\Delta T_1$, between time t7 and time t9, where time t9 is the time at which the transmission of the uplink data using the allocated resources would begin, if no timing advance were to be applied. Time t9 may be considered as a 'nominal transmission time'. It will be appreciated that the nominal transmission time may be determined in accordance with any suitable technique. For example, it may be determined based on an offset relative to a synchronisation signal, or may be selected autonomously (e.g. randomly) by the communications device.

Based on the timing advance indication 822, the communications device determines the timing advance value valid at time t7 (where t7=$T_{REF}$). In some embodiments, the communications device applies a further correction to this value to account for the difference in round trip time at $T_{REF}$ and the round trip time at the nominal transmission time t9. This may be based on ephemeris data associated with the satellite.

Accordingly, the communications device determines a timing advance valid at time t9, TA(t9), to be applied to the uplink data transmission. The transmission time is then determined, based on t9 and TA(t9), to be time t8. In some embodiments, the location and/or motion of the communications device is also taken into account in determining TA(t9). In particular, in some embodiments, where the timing advance determined by the base station is based on a location of the communications device at a particular time, the communications device may take into account any change in location between that particular time and the time t9, in determining TA(t9).

Accordingly, embodiments of the present technique can ensure that an accurate timing advance is used which accounts for movement of the communications device between a determining timing advance and a time of transmission of uplink signals.

At time t8, the communications device initiates transmission of the uplink data 808 to the base station.

Accordingly, embodiments of the present technique can provide for the calculation of a timing advance, to be applied to an uplink transmission, which takes into account the possibility that the round-trip time may vary significantly within a short time period. In the example of FIG. 8 and FIG. 9, the motion of the non-terrestrial network part 310 is such that the round-trip delay changes significantly between time t5, when the timing advance is determined, and time t7, when the corresponding indication is received by the communications device 306.

In the example of FIG. 9, the timing advance indication is transmitted together with an uplink allocation indication. However, in some embodiments, no uplink allocation indication is sent. The uplink resources may be determined autonomously by the communications device. Because $T_{REF}$ is not related to the timing of the uplink transmission, embodiments of the present technique can provide an accurate timing advance value to be used for an uplink transmission by the communications device, even if the base station cannot determine or has not determined, when it determines the timing advance value, when the communications device will transmit the uplink data.

In some embodiments, the timing advance indication is transmitted using a repetition transmission scheme, comprising R transmissions. For example, in accordance with a conventional eMTC transmission scheme, the R transmissions may occur over a period of around 2 seconds. In accordance with a conventional NB-IoT transmission scheme, the R transmissions may occur over a period of around 4 seconds.

In some embodiments, the time $T_{REF}$ is the time at which the nth transmission in the sequence of R transmissions of the timing advance indication (or the message containing it) is received at the communications device. In some embodiments, n=R, i.e., the time $T_{REF}$ is the time at which the last transmission in the sequence of R transmissions is received at the communications device.

Figure 10:
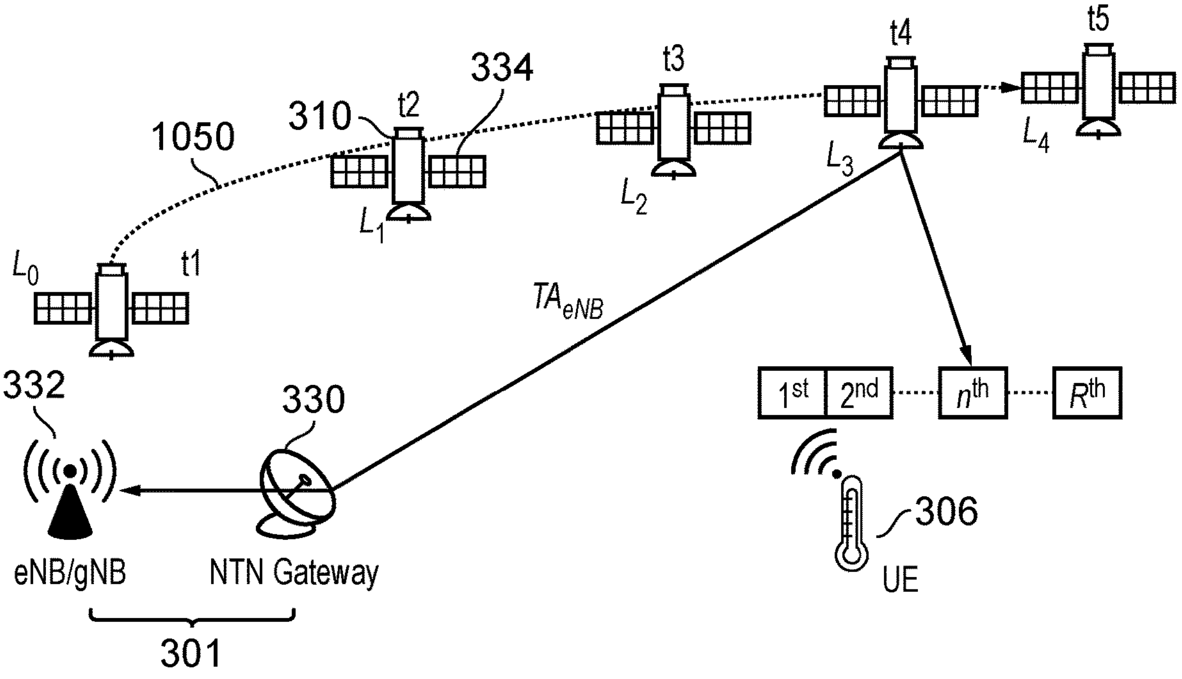
FIG. 10 shows an example scenario in which a reference time is a time at which a transmission in a sequence of transmissions is received at a communications device, in accordance with embodiments of the present technique.

FIG. 10 shows an example scenario in which $T_{REF}$ is the time at which the nth transmission in the sequence of R transmissions of the timing advance indication (or the message containing it) is received at the communications device 306, in accordance with embodiments of the present technique. The example of FIG. 10 may be similar to the example of FIG. 8 and FIG. 9. In the example of FIG. 10, the non-terrestrial network part 310 follows a path 1050, such that at times t1, t2, t3, t4, t5, the non-terrestrial network part 310 is at positions $L_0$, $L_1$, $L_2$, $L_3$, $L_4$, $L_5$, respectively. At time t1, the base station 310 calculates the time $T_{REF}$ and the corresponding timing advance TA($T_{REF}$). The time $T_{REF}$ is determined based on a transmission schedule for the R repetitions of the message carrying the timing advance indication.

In some embodiments, the communications device is able to decode the timing advance indication before all R transmissions have been received, and in particular before the nth transmission has been received. In some such embodiments, the communications device may determine $T_{REF}$ based on a predetermined schedule for the transmission of the R transmissions.

Accordingly, embodiments of the present technique can provide for the calculation of a timing advance, to be applied to an uplink transmission, which takes into account the possibility that the round-trip time may vary significantly during the transmission of control information using a repetition scheme.

In some embodiments, the base station may transmit an uplink allocation indication, comprising an indication allowing the communications device to determine communication resources which it is allocated for the transmission of uplink data. The timing advance indication may be in the same message as the uplink allocation indication, or separate. (p.9, last para)

In some such embodiments, the time $T_{REF}$ is the start time associated with those communication resources. In some embodiments, the time $T_{REF}$ is the end time associated with those communication resources.

In some embodiments, the uplink communication resources are allocated for the transmission of uplink data in accordance with a repetition transmission scheme, according to which the uplink data is transmitted Q times. The time $T_{REF}$ in some such embodiments is the time of transmissions of the mth repetition.

In the examples above, the uplink allocation is explicitly signalled to the communications device. However, in some embodiments, the uplink allocation is determined by the communications device when no uplink allocation indication is received. For example, the uplink transmission may be determined according to a pre-determined algorithm or rule which is known at both the base station and the communications device.

Figure 11:
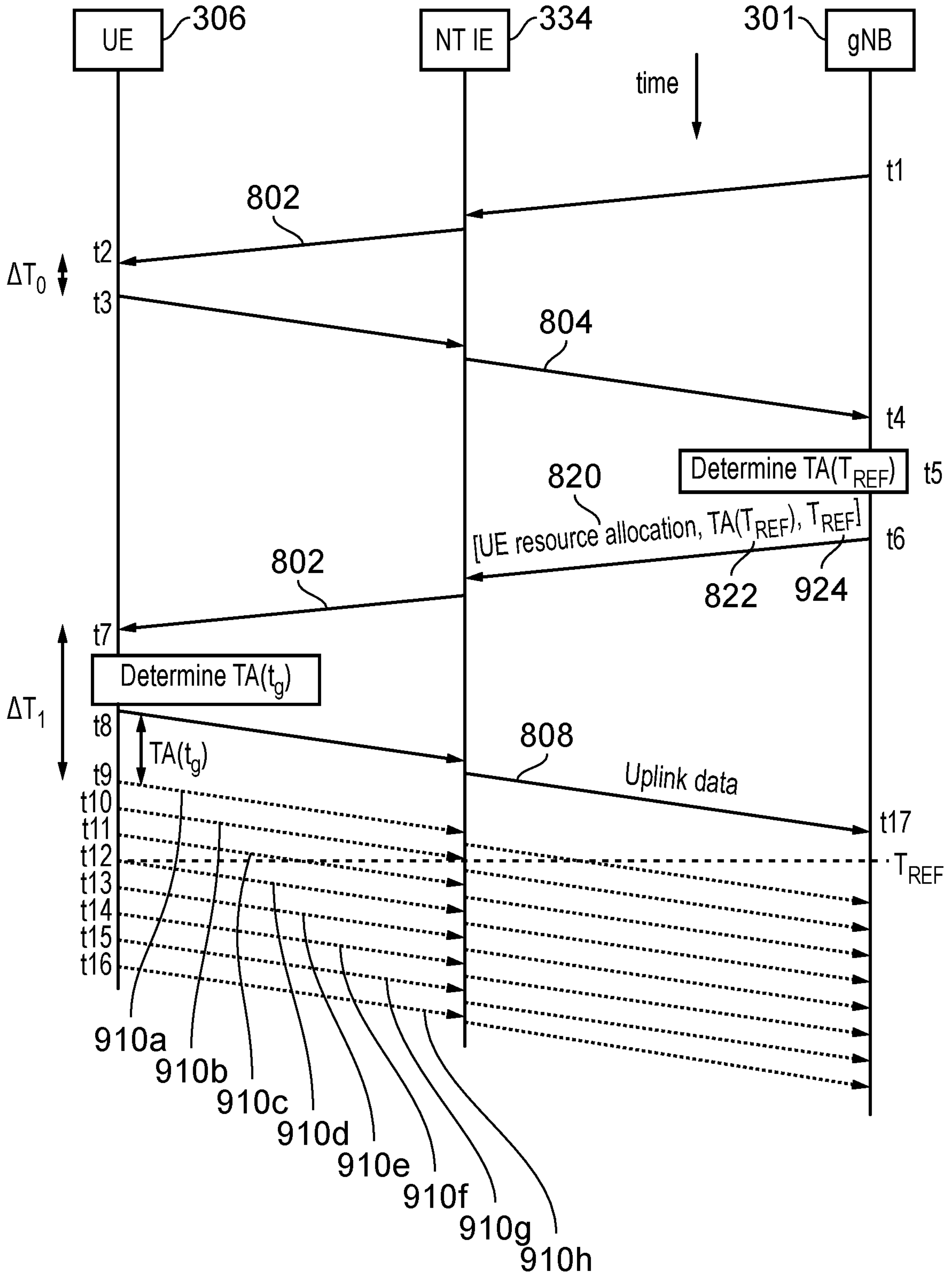
FIG. 11 shows an example of the transmission of uplink data by a communications device in accordance with embodiments of the present technique.

FIG. 11 shows an example of the transmission of uplink data by a communications device (which may be the communications device 306 of FIG. 4) in accordance with embodiments of the present technique.

Many of the steps and entities shown in FIG. 11 are the same as in FIG. 9, and are numbered using like reference numerals.

In the example of FIG. 11, uplink communication resources are allocated by the base station 301 for the transmission of the uplink data by the communications device 306, the transmission of the uplink data to be in accordance with a repetition transmission scheme, where Q=8. The time $T_{REF}$ is set to be the transmission time (assuming TA=0) of the fourth repetition of the uplink data, i.e., m=4.

The uplink resources are allocated such that, if no timing advance were applied by the communications device, the Q uplink transmissions 910*a-h* would be initiated at times t9-t16 inclusive. Accordingly, the base station 301, at time t5, determines the timing advance value applicable at time t12, the time at which (with no timing advance applied) the communications device would transmit the fourth repetition of the uplink data.

At time t6, the base station 301 transmits a message 802 comprising the resource allocation indication 820 and the timing advance indication 822. In some embodiments, as shown in the example of FIG. 11, the base station 301 also transmits a reference time ($T_{REF}$) indication 924, which allows the communications device to determine the time $T_{REF}$ corresponding to the timing advance value. In the example of FIG. 11, this may comprise an indication of m.

At time t7, the communications device receives the message 802.

In response to receiving the message, the communications device 306 may first determine the time $T_{REF}$ This may be based on the resource allocation indication 820 and/or the $T_{REF}$ indication 924. In the example of FIG. 11, it determines that:

- $T_{REF}$ is equal to the nominal transmission time of the fourth repetition of the uplink data;
- the nominal transmission times of the repetitions of the uplink data 910*a-h* are t9, t10, . . . t16 (e.g. based on the offset $\Delta T_1$ and the time t7 at which the resource allocation indication 820 was received); and
- the nominal transmission time of the fourth repetition of the uplink data 910*d* is thus time t12, and accordingly determines that $T_{REF}$=time t12.

The communications device then determines the timing advance to be applied to the first of the repeated uplink data transmissions, i.e., TA(t9).

In some embodiments, for example, where the timing advance may be expected not to vary materially over the duration from time t9 to time t12, the timing advance applied to the first transmission may be equal to the timing advance indicated by the timing advance indication, i.e. TA(t9)=TA(t12)=TA($T_{REF}$).

In some embodiments, the communications device may apply a correction to TA($T_{REF}$) to arrive at a value for TA(t9), for example in a similar manner as described above in the example of FIG. 9.

The communications device 306 then determines t8 as t9−TA(t9), and transmits at time t8 the first repetition 910*a* of the uplink data 808, which is received at time t17 by the base station 301.

The communications device 306 repeats the process for each of the $2^{nd}$ to $8^{th}$ repetitions of the uplink data.

In general, for each transmission, the communications device may determine

- a nominal transmission time;
- a corrected TA corresponding to the nominal transmission time, based on the nominal transmission time, TA($T_{REF}$), $T_{REF}$, and
- an actual transmission time, based on the corrected TA and the nominal transmission time.

For clarity, the actual transmissions of the $2^{nd}$ to $8^{th}$ repetitions of the uplink data are not shown in FIG. 11.

Embodiments of the present technique can therefore allow a more accurate determination at the communications device of an applicable timing advance. Because $T_{REF}$ is based on the allocated uplink resources, the applicable timing advance can be calculated without reference to the time of transmission or reception of any signalling from the base station (other than to any extent necessary to determine the uplink resource allocation). This can be particularly beneficial when, for example, the duration between the reception of the timing advance indication 822 and the start of the uplink resources is large, such that there may be a significant difference in the timing advance at these times.

In some embodiments, the reference time $T_{REF}$ is the time at which the base station transmits the timing advance indication to the communications device.

Accordingly, referring to the example of FIG. 11, $T_{REF}$ may be set equal to time t6.

Embodiments of the present technique may therefore allow for reduced modifications to the base station procedures, compared with a conventional approach. In embodiments where $T_{REF}$ does not depend on any behaviour of the communications device, a common approach at the base station can be used, irrespective of whether, or how, any uplink communication resources are allocated, and irrespective of whether in fact the communications device will transmit any uplink signalling at all. Accordingly, for example, such embodiments may be particularly suitable where semi-persistent scheduling, or configured grants are used to provide speculative resource allocations which may or may not be used by the communications device for the transmission of uplink data.

In some embodiments, the base station transmits a base station location indication, which indicates the location of the base station. Where the base station is ground-based (as in the example of FIG. 4) the base station location indication may indicate the location of the ground station 330. Where the non-terrestrial infrastructure equipment performs some or all of the functions of a base station, the base station location indication may indicate the location of the non-terrestrial infrastructure equipment or of the non-terrestrial network part which is co-located with, or comprises, the non-terrestrial infrastructure equipment.

In some embodiments, including those described elsewhere herein, the communications device determines a timing advance value and/or applies a correction to a timing advance value provided by the base station. In some such embodiments, the communications device determines the timing advance value and/or the correction (as applicable) based on the location indicated by the base station location indication.

In some embodiments, the base station location indication is transmitted within radio resource control (RRC) signalling. In some embodiments, the base station location indication is transmitted as part of a procedure for the establishment of a connection, such as an RRC connection, between the base station and the communications device.

Accordingly, embodiments of the present technique can allow the communications device to determine a timing advance (either directly, or based on a timing advance value provided by the base station) which takes into account the location of the base station. For example, where the base station is ground-based, the communications device may determine or estimate a propagation delay for signals transmitted between the communications device and the base station, based on the indicated location of the base station in combination with a determined location of the non-terrestrial network part 310 and a determined location of the communications device.

In some embodiments, both the base station and communications device have access to a common reference clock. For example, both may be able to determine a common absolute time, based on signals received from a GNSS.

In some such embodiments, the base station may transmit a timestamp indication to the communications device, from which the communications device is able to determine the (absolute) time at which the timestamp indication (or other indication) was transmitted. The communications device may determine a propagation delay associated with the transmission of the indication, based on the time indicated by the timestamp indication, and the time (as determined at the communications device) of receipt of the indication.

In some embodiments, the timestamp indication may be transmitted together with a timing advance indication, and may indicate the time of transmission of the timestamp indication and timing advance indication.

In some embodiments, the communications device determines a timing drift rate associated with signals. In some embodiments, the timing drift rate is calculated in respect of downlink reference signals transmitted by the base station, such as cell-specific reference signals (CRS). In some embodiments, the timing drift rate is calculated in respect of uplink signals transmitted by the communications device and received at the base station. In some embodiments, the base station may transmit a timing drift indication to the communications device, indicating an amount or rate of detected drift.

The communications device may, in some embodiments, calculate (or correct) a timing advance value based on the timing drift rate which it has measured, or which is determined based on a timing drift indication received from the base station.

Determination and Indication of $T_{REF}$

In some embodiments, the relationship between $T_{REF}$ and another event is standardised. For example, it may be standardised (and thus pre-configured at the communications device and base station) that $T_{REF}$ is the time at which the base station begins transmitting the timing advance indication.

In some embodiments, there may be two or more $T_{REF}$ times which are permitted (e.g. according to a standards specification) in a given scenario. For example, the base station may select from one of a plurality of permitted $T_{REF}$ times when determining a timing advance. In some such scenarios, a reference time indication may be transmitted by the base station to the communications device, comprising an indication allowing the communications device to determine the $T_{REF}$ associated with a timing advance value. The $T_{REF}$ indication 924 in the example of FIG. 11 is an example of a reference time indication.

In some embodiments, the reference time indication indicates the time $T_{REF}$ for a particular timing advance value, i.e. the reference time indication is associated with a particular timing advance indication.

In some embodiments, the reference time indication indicates a rule or manner, in accordance with which a subsequent one or more timing advance values are determined. Such a reference time indication may be transmitted in broadcast signalling, and may apply to timing advance values determined in respect of two or more different communications device.

In some embodiments, the reference time indication is transmitted in RRC signalling to the communications device.

In some embodiments, the reference time indication is transmitted together with the timing advance indication in a single message. The message may be, for example, a medium access control (MAC) control element (CE).

In some embodiments, the reference time indication is transmitted together with a resource allocation indication in a single message. For example, the reference time indication and the resource allocation indication may be transmitted within a DCI. The reference time indication and resource allocation indication may be transmitted in a random access response message, which is transmitted in response to the receipt of a random access request message transmitted by the communications device.

As disclosed elsewhere herein, in some embodiments, the time $T_{REF}$ may correspond to a transmission or reception time of a particular instance of a repeated transmission of a message or data. In some such embodiments, the reference time indication comprises an indication of the particular instance (for example, the value of n or m), or a means of determining it. For example, the reference time indication may indicate that n is half of the value of R.

Timing Advance Indication

As described elsewhere herein, in some embodiments, the base station may transmit a timing advance indication (such as the timing advance indication 822 of the examples of FIG. 9 and FIG. 11) to the communications device. The timing advance indication may be transmitted within a MAC CE.

In some embodiments, the timing advance indication may be transmitted via a control channel, such as an NPDCCH or MPDCCH.

In some embodiments, the timing advance indication may be transmitted via a downlink shared channel, such as an NPDSCH or a PDSCH.

UE-Estimated Timing Advance

In some embodiments, the communications device may determine a timing advance value. This may be in addition to, or as an alternative to, receiving a timing advance indication transmitted by the base station.

The communications device may determine a timing advance based on one or more of a determination of its location (e.g. using a GNSS), a determination of the location of the non-terrestrial network part, and a determination of the location of a ground station.

In some embodiments, these determinations may provide indications which are valid at different times. For example, the communications device may determine, using GNSS, its location at a first time. The communications device may determine, for example using ephemeris data or based on a transmission by the non-terrestrial infrastructure equipment, a location at a second time of the non-terrestrial network part.

In some embodiments, the communications device may apply a correction to location data in order to determine a "UE-estimated" (UEE) timing advance value for a transmission at a particular time. This time may be referred to as a $T_{REF}$ (UE), i.e. a reference time associated with a "UE-estimated" timing advance value.

In an embodiment, the reference time $T_{REF}$ (UE) is the time when the "UE-estimated" timing advance is determined. For example, if the communications device obtained GNSS measurements and determined its location at a particular time, $T_{REF}$ (UE) is the time when the calculation of the timing advance is made.

In some embodiments, reference time $T_{REF}$ (UE) is the time when the first uplink transmission starts. In some embodiments, the reference time $T_{REF}$ (UE) is the time when the kth repetition of the uplink transmission is transmitted.

In some embodiments, the reference time $T_{REF}$ (UE) is determined based on signalling transmitted by the base station. For example, the value k can be RRC configured, indicated in the DCI or fixed in the specifications. The value k may be expressed as a fraction of the total number of repetitions (e.g. half of total repetitions, quarter of total repetitions).

Processing a "UE-Estimated" Timing Advance and a Timing Advance Indication

In some embodiments, the communications device may determine a UE-estimated timing advance, and may also receive a timing advance indication transmitted by the base station.

According to embodiments of the present technique, the communications device determines a timing advance to apply to a particular transmission, the timing advance being determined based on a "UE-estimated" (UEE) timing advance and on a timing advance indication transmitted by a base station, which indicates a "base station estimated" (BSE) timing advance.

In some embodiments, the UEE timing advance and BSE timing advance are associated with different respective $T_{REF}$ times. In some such embodiments, the communications device applies an adjustment to one or both of the UEE timing advance and the BSE timing advance, so that both are associated with the same reference time $T_{REF}$.

For example, the BSE timing advance may be adjusted based on a determined timing drift rate, a location of the base station, ephemeris information associated with the non-terrestrial network part, to obtain an adjusted BSE timing advance, having a $T_{REF}$ time which is the same as the $T_{REF}$ time associated with the UEE timing advance.

In some embodiments, one or both of the UEE timing advance, and the BSE timing advance are adjusted to have a $T_{REF}$ time which corresponds to an uplink transmission time, such as a first uplink transmission time, or a transmission time of a particular repetition of a repeated uplink transmission.

In some embodiments, the base station transmits an adjustment indication, which indicates how, or if, the communications device is to adjust a BSE timing advance. For example, in some embodiments, the base station may indicate that no adjustment is to be made. In some such embodiments, the base station may have determined that the change in propagation delay (and therefore, the magnitude of any required adjustment) is small, relative to an amount which can be accepted by the base station. The adjustment indication may alternatively indicate that the BSE timing advance is to be adjusted for a nominal transmission time of uplink data.

The adjustment indication may be transmitted in RRC signalling.

The adjustment indication may be transmitted in the same message as the resource allocation indication and/or the timing advance indication. The message may have a MAC CE comprising the adjustment indication. The message may be a DCI comprising the resource allocation indication.

Accordingly, embodiments of the present technique can ensure that a timing advance used by the communications device is predictable and can avoid unnecessary adaptation of a BSE timing advance.

In some embodiments, the timing advance applied to a transmission is selected from one of the (adjusted, if applicable) UEE timing advance and the BSE timing advance. For example, if the UEE timing advance was determined before the timing advance indication (indicating the BSE timing advance) is received, then the applied timing advance is based on the UEE timing advance, and not on the BSE timing advance.

In some embodiments, the communications device determines a derivation time associated with the BSE timing advance, which corresponds to the time at which the BSE timing advance was determined by the base station. The derivation time may be indicated in the timing advance indication. Additionally or alternatively, the derivation time may be a predetermined duration before the transmission or reception of the timing advance indication.

In some embodiments, only the one of the BSE timing advance and the UEE timing advance which was derived/determined last is used to determine the applied timing advance.

For example, the communications device may determine the UEE timing advance based on GNSS measurements made after the timing advance indication was transmitted. In such a case, the BSE timing advance derivation time cannot have been earlier than the derivation time for the UEE timing advance, and accordingly, the applied timing advance is determined based on the UEE timing advance.

Embodiments of the present technique can therefore ensure that more up-to-date (and therefore, more accurate) timing advance information is used.

In some embodiments, the timing advance applied to a transmission is calculated as the average of from the UEE timing advance and the BSE timing advance, where one, neither or both have been adjusted.

In some embodiments, if a difference between the UEE timing advance and the BSE timing advance exceeds a predetermined threshold, then the timing advance applied to a transmission is the BSE timing advance.

Embodiments of the present technique can therefore apply a base station-determined timing advance (or a timing advance, based on a base station-determined value) where there is a significant discrepancy between that value and a value determined at the communications device.

In some embodiments, the timing advance applied to a transmission is determined based on one or both of the UEE timing advance and the BSE timing advance, in accordance with a selection indication transmitted by the base station. For example, the selection indication may indicate that the timing advance applied to a transmission is to be the BSE timing advance. The communications device may accordingly transmit the uplink data using the BSE timing advance.

Figure 12:
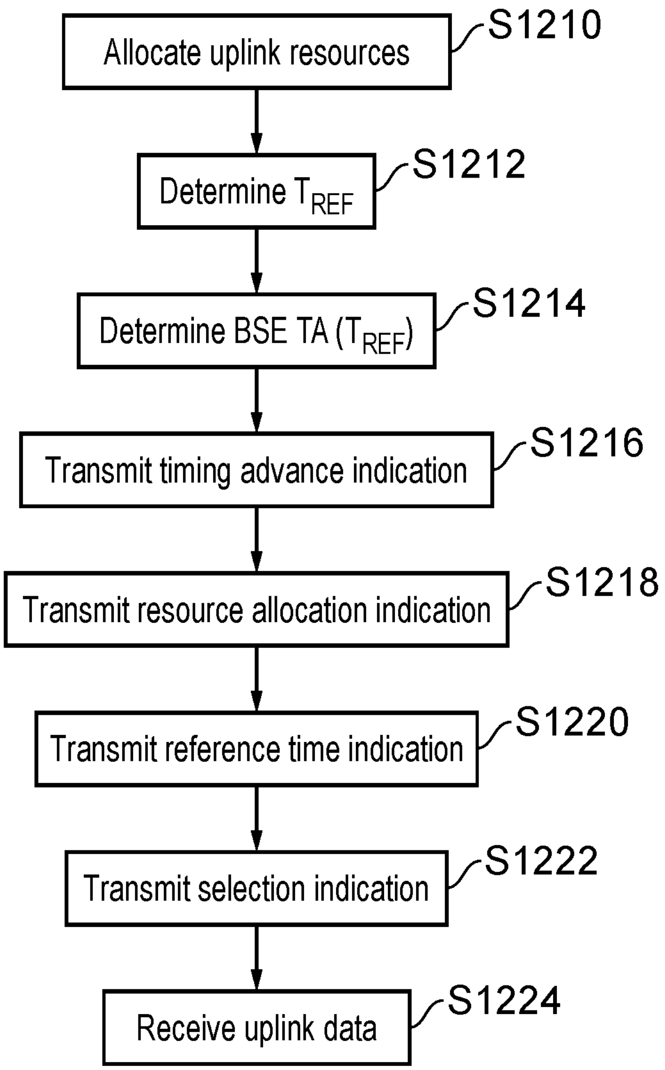
FIG. 12 is a flow chart for a process which may be carried out by a base station or infrastructure equipment in accordance with embodiments of the present technique.

FIG. 12 is a flow chart for a process which may be carried out by an infrastructure equipment (such as the base station 310 of the examples described herein, or the non-terrestrial infrastructure equipment 334 of FIG. 4).

The process starts at step S1210, in which the base station allocates communications resources on a wireless access interface, for an uplink transmission of data by the communications device.

At step S1212, the base station determines the time $T_{REF}$, which is a time for which a timing advance estimate is to be obtained. Examples of $T_{REF}$ may include a time when a timing advance indication is transmitted to the communications device, a time when a timing advance indication is received by the communications device, a start of the allocated communication resources or a transmission start time of a particular instance of a sequence of repeated transmissions of either the uplink data or the timing advance indication.

At step S1214, the base station determines a base station estimated (BSE) timing advance for the time $T_{REF}$. The BSE timing advance may be determined based on one or more of a round trip time measurement and a satellite location estimate at time $T_{REF}$. The satellite location may be determined based on ephemeris data associated with the satellite.

At step S1216, the base station transmits a timing advance indication to the communications device, comprising an indication of the BSE timing advance.

At step S1218, where step S1210 has been carried out, the base station may additionally transmit a resource allocation indication, indicating the communication resources allocated at step S1210.

At step S1220, the base station may additionally transmit a reference time indication, for allowing the communications device to determine the time $T_{REF}$.

In some embodiments, the base station may transmit an adjustment indication, which indicates how, or if, the communications device is to adjust a BSE timing advance.

In some embodiments, the base station may additionally transmit information such as the base station (e.g. ground station) location, measurement timing drift rate, and/or timestamp, for allowing the communications device to apply an appropriate adjustment to the BSE timing advance.

At step S1222, the base station may transmit a selection indication, to indicate whether a timing advance to be applied to an uplink transmission is to be based on the BSE timing advance, a UE-estimated (UEE) timing advance, or both.

At step S1224, the base station receives the uplink data, transmitted by the communications device using a timing advance value.

Figure 13:
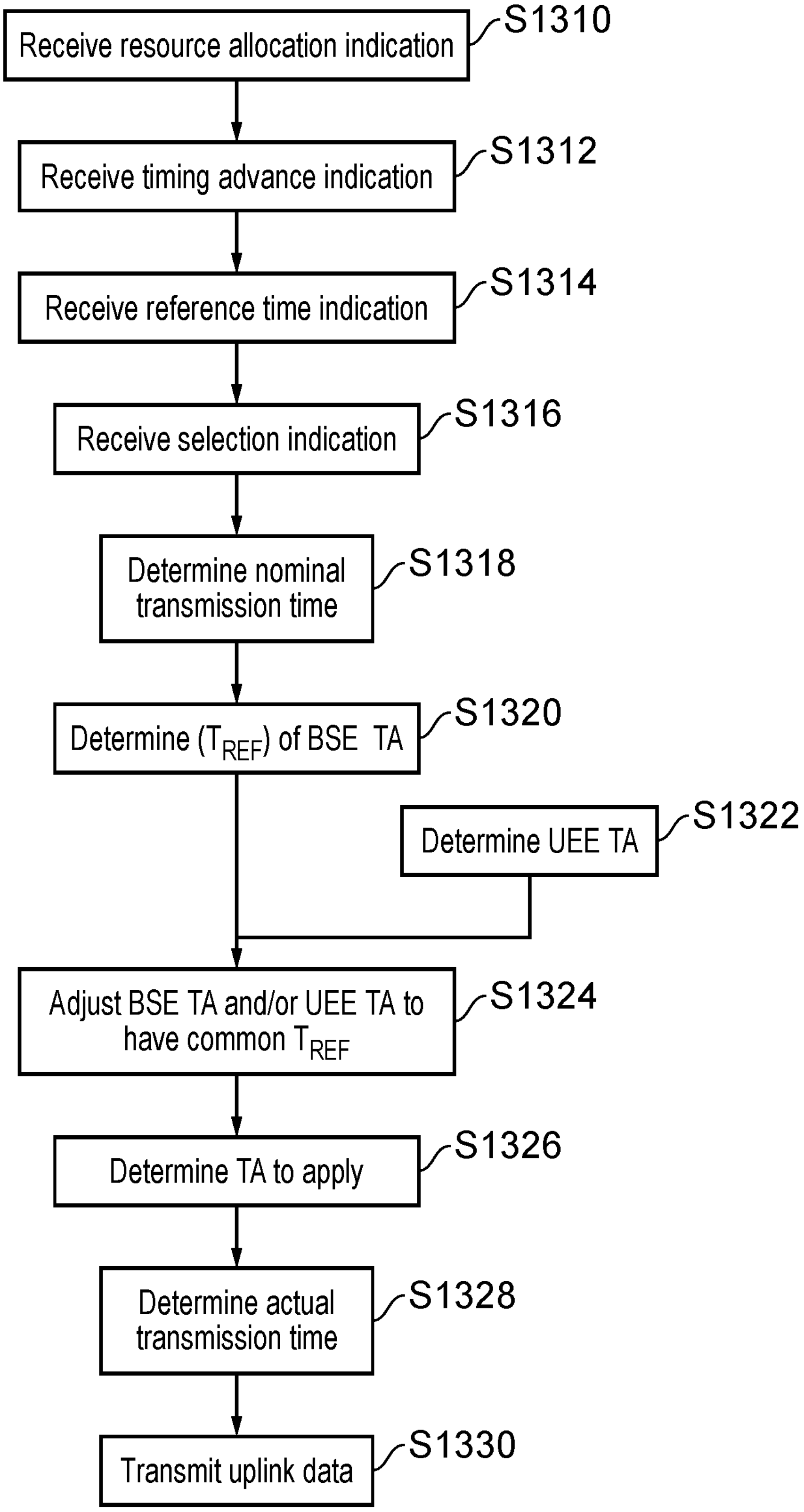
FIG. 13 is a flow chart for a process which may be carried out by a communications device in accordance with embodiments of the present technique.

FIG. 13 is a flow chart for a process which may be carried out by a communications device (such as the communications device 306 of the examples described herein).

The process of FIG. 13 may start at step S1310 at which the communications device receives a resource allocation indication, indicating uplink communication resources for the transmission of uplink data.

Alternatively or additionally, the communications device may autonomously select uplink communication resources to be used for the transmission of the uplink data.

At step S1312, the communications device receives a timing advance indication from a base station, indicating a BSE timing advance.

At step S1314, the communications device may receive a reference time indication from the base station.

At step S1316, the communications device may receive a selection indication, indicating whether an actual timing advance to be used when transmitting the uplink data is to be based on the BSE timing advance, a UEE timing advance or both.

At step S1318, the communications device determines a nominal transmission time for the uplink data. This may be based on the resource allocation indication received at step S1310, or may be based on the communication resources autonomously selected by the communications device.

At step S1320, the communications device determines the reference time, $T_{REF}$, associated with the BSE timing advance. This may be determined based on the reference time indication and/or based on predetermined rules. It may be determined based on one or more of the time of reception of the timing advance indication, the time of transmission of the timing advance indication, the nominal transmission start time for the uplink data and the nominal transmission end time for the uplink data. In some embodiments, where the uplink data is to be transmitted in accordance with a repetition scheme, $T_{REF}$ may be the nominal transmission time of a one of the instances of the sequence of repeated transmissions.

At step S1322, the communications device may determine a UE-estimated (UEE) timing advance, associated with a particular reference time. The UEE timing advance may be based on an estimate of the location of non-terrestrial network part 310, which may be determined based on ephemeris data or other location information.

Location information of a non-terrestrial network part may be obtained by the communications device in accordance with any of the techniques disclosed in co-pending EP application EP21151456.7 [5], the contents of which are hereby incorporated in their entirety.

At step S1324, the communications device may adjust one or both of the BSE timing advance and the UEE timing advance, such that both are now associated with a common reference time. The common reference time may be the nominal transmission time. The adjustment to the BSE timing advance may be carried out in accordance with one or more indications received from the base station. These may indicate one or more of an adjustment indication, a timestamp, an indication of a measurement timing drift rate, and a base station or ground station location.

At step S1326, the communications device determines the timing advance to be applied to the uplink transmission. This may be based on one or more of the selection indication, the UEE timing advance and the BSE timing advance. For example, as described elsewhere herein, this may be done using an average of the UEE timing advance and BSE timing advance. The timing advance may be based on a further adjustment, if the common reference time used in step S1324 is not the nominal transmission time.

At step S1328, the communications device determines the actual transmission time for the uplink data, based on the nominal transmission time, and the timing advance determined at step S1326.

At step S1330, the communications device transmits the uplink data at the transmission time determined at step S1328.

Where the uplink data is transmitted using a repetition scheme, one or more of these steps may be repeated in respect of each instance of the transmission. In some embodiments, the steps performed may differ in respect of different instances. For example, for some instances, only steps S1326, S1328 and S1330 may be carried out for some instances, if the same timing advance is to be used as for an earlier instance.

In the examples described above, the BSE timing advance and UEE timing advance are determined based on the estimated propagation delay between the base station and the communications device. In some embodiments, one or both of the BSE timing advance and UEE timing advance are determined based on an estimated propagation delay to/from an intermediate point, such as the non-terrestrial network part.

In some embodiments the intermediate point is common to both the BSE timing advance and the UEE timing advance. For example, with reference to FIG. 4, the intermediate point may be the non-terrestrial infrastructure equipment 334.

In the examples described herein, there is a single non-terrestrial infrastructure equipment in the transmission path between the base station and the communications device. However, the present disclosure is not so limited, and the transmission path may comprise two or more non-terrestrial infrastructure equipment, mounted on, colocated with, or forming part of respective non-terrestrial network parts.

Figure 14:
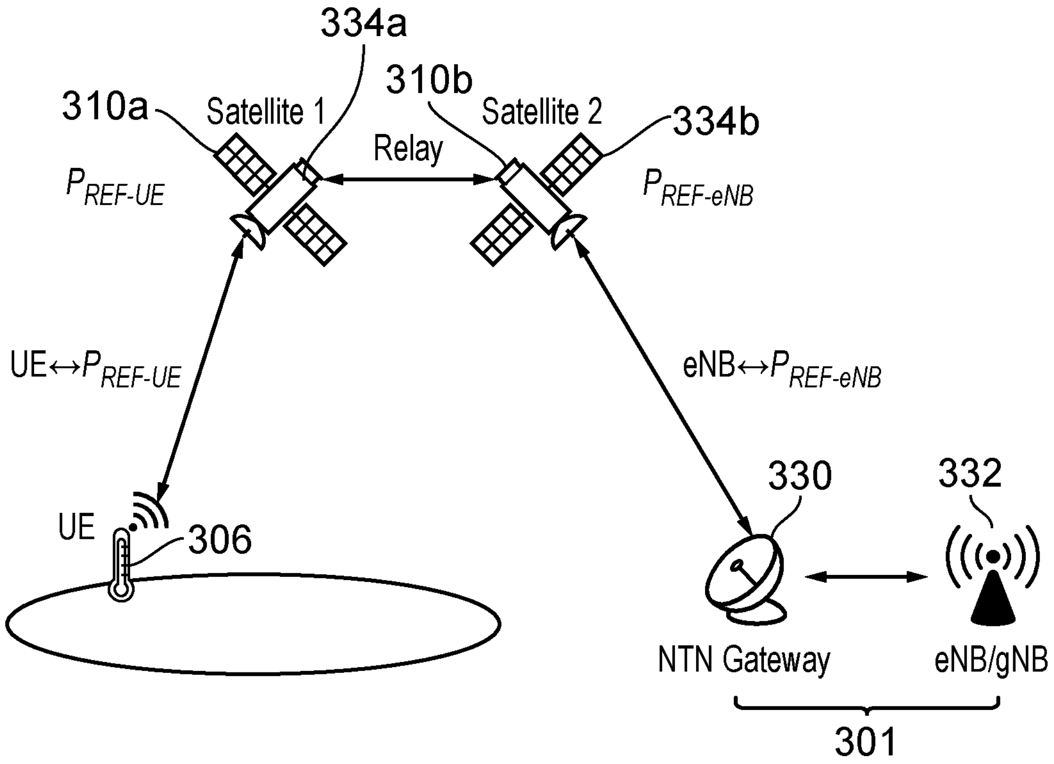
FIG. 14 illustrates a scenario where intermediate points used in the estimation of timing advance values are different, in accordance with embodiments of the present technique.

In some such embodiments, the intermediate points may be different. This can be for a case where there are two or more relay satellites. An example is shown in FIG. 14, where the UEE timing advance is estimated based on a propagation delay between the communications device and a first non-terrestrial infrastructure equipment 334*a*, and the BSE timing advance is estimated based on a propagation delay between the base station and a second non-terrestrial infrastructure equipment 334*b*.

An inter-satellite link may connect the first and second non-terrestrial infrastructure equipment 334*a*, 334*b*, over which transmissions between the communications device 306 and base station 310 are relayed.

In some embodiments, one or both of the intermediate points are indicated by the base station in an intermediate point indication, transmitted by the base station 310 to the communications device 306. The intermediate point indication may be transmitted in RRC signalling.

In some embodiments where the timing advance estimates are based on one or more intermediate points, the timing advance determined at step S1326 of the process shown in FIG. 13 may be obtained by adding the UEE timing advance and the BSE timing advance.

Where the intermediate points are different, a further adjustment may be made. For example, the timing advance may be determined by additionally adding a delay to account for the inter-satellite communications link of FIG. 14. This may be done after step S1324 of the process of FIG. 13, and the delay of the inter-satellite link may be determined based on the locations of the satellites at the common reference time.

In some embodiments, the delay of the inter-satellite link may be determined at the base station, and an indication of it may be transmitted to the communications device 306, for example, using RRC signalling.

In the processes shown in FIG. 12 and FIG. 13, one or more steps may be omitted, and steps may be performed in a different order than that shown.

In some examples described herein, the non-terrestrial network part 310 may be a satellite. However, the present disclosure is not so limited, and in some embodiments, there is no non-terrestrial network part. In other embodiments, the non-terrestrial network part may be an aerial vehicle, a drone, or a balloon for example.

In some embodiments, the non-terrestrial infrastructure equipment performs some of the functionality of the base station, and one or more steps described herein as performed by a base station may accordingly be performed by the non-terrestrial infrastructure equipment.

In the present disclosure, a timing advance is used to determine an actual transmission time of signals representing uplink data. However, the scope of the present disclosure is not limited to any particular uplink signalling, and the signals may represent user data (e.g. data generated at an application layer), data to be transmitted using a radio link control (RLC) protocol, or any other signalling representing control or user data originating at any point in a protocol stack. In some embodiments, the control or user data may originate at a further device, in which case the communications device 306 may provide a relay functionality for transmitting the control or user data from the originator to the base station.

In some examples disclosed herein, there is described a combination of timing advance determination steps, a timing advance indication transmission step, and a use of a timing advance. However, the present disclosure is not limited to the specific combinations of steps disclosed herein. For example, with reference to FIG. 9, there is disclosed herein a step of timing advance determination based on a round trip time measurement. However, in some embodiments, a different timing advance determination step may be used (such as based on satellite and/or communications device location information), for example. Similarly, in other embodiments, the reference time $T_{REF}$ may be different, and/or the manner in which (or whether) the BSE timing advance is used at the communications device may differ from the specific examples described elsewhere herein.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present disclosure.

Thus there has been described a method of operating an infrastructure equipment of a wireless communications network, the method comprising determining a reference time at which a timing advance estimate is to be valid; estimating, before the reference time, a timing advance which is valid for a transmission by a communications device at the reference time; and transmitting a timing advance indication to the communications device indicating the timing advance which is valid for a transmission by the communications device at the reference time.

There has also been disclosed a method of operating a communications device for transmitting signals representing uplink data to a wireless communications network via a wireless access interface, the method comprising determining a first time for transmitting the signals representing the uplink data to the wireless communications network, and transmitting at the first time on the wireless access interface signals representing the uplink data, wherein determining the first time comprises receiving a timing advance indication comprising an indication of a timing advance estimate valid at a first reference time, determining the first reference time associated with the timing advance estimate, determining the first time based on the first reference time and the timing advance estimate.

There has also been disclosed a method of operating a communications device for transmitting signals representing uplink data to a wireless communications network via a wireless access interface, the method comprising determining a first time for transmitting the signals representing the uplink data to the wireless communications network, and transmitting at the first time on the wireless access interface the signals representing the uplink data, wherein determining the first time comprises receiving a timing advance indication comprising an indication of a first timing advance estimate valid at a first reference time, determining a second reference time at which a second timing advance estimate is to be valid, estimating, before the first time, the second timing advance valid for a transmission by the communications device at the second reference time, and determining the first time based on one or both of the first timing advance estimate and the second timing advance estimate.

Corresponding apparatus, circuitry and computer readable media have also been described.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the communications device. It will be appreciated such predetermined/predefined information may in general be established, for example, by definition in an operating standard for the wireless telecommunication system, or in previously exchanged signalling between the base station and communications devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of communications device and wireless communications network, but can be applied more generally in respect of any types of communications device.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of operating an infrastructure equipment of a wireless communications network, the method comprising determining a reference time at which a timing advance estimate is to be valid; estimating, before the reference time, a timing advance which is valid for a transmission by a communications device at the reference time; and transmitting a timing advance indication to the communications device indicating the timing advance which is valid for a transmission by the communications device at the reference time.

Paragraph 2. A method according to paragraph 1, wherein the timing advance indication is transmitted at the reference time.

Paragraph 3. A method according to paragraph 1, wherein the reference time is a time at which the timing advance indication is received at the communications device.

Paragraph 4. A method according to paragraph 1, wherein the timing advance indication is transmitted in accordance with a repetition scheme according to which the timing advance indication is repeatedly transmitted using a sequence of transmission instances, and the reference time is a time at which a transmission instance of the sequence of transmission instances is received at the communications device.

Paragraph 5. A method according to paragraph 1, wherein the reference time is a time of transmission of an instance of a sequence of transmissions of uplink data in accordance with a repetition scheme.

Paragraph 6. A method according to any of paragraphs 1 to 5, the method comprising transmitting a reference time indication for allowing the communications device to determine the reference time.

Paragraph 7. A method according to any of paragraphs 1 to 6, the method comprising transmitting a resource allocation indication, indicating communication resources allocated to the communications device for the transmission of the signals.

Paragraph 8. A method according to any of paragraphs 1 to 7, the method comprising transmitting a selection indication, indicating that the communications device is to determine a timing advance to be used for the transmission of the signals based on the timing advance indicated by the timing advance indication, irrespective of a timing advance estimate determined at the communications device.

9. A method according to any of paragraphs 1 to 7, the method comprising transmitting a selection indication, indicating that the communications device is to determine a timing advance to be used for the transmission of the signals based on the timing advance indicated by the timing advance indication and a timing advance estimate determined at the communications device.

Paragraph 10. A method according to any of paragraphs 1 to 9, wherein the wireless communications network comprises one or more non-terrestrial infrastructure equipment, and the signals representing the uplink data are transmitted by a first non-terrestrial infrastructure equipment of the one or more non-terrestrial infrastructure equipment.

Paragraph 11. A method according to paragraph 10, wherein the infrastructure equipment is one of the one or more non-terrestrial infrastructure equipment.

Paragraph 12. A method according to paragraph 10 or paragraph 11, wherein each of the one or more non-terrestrial infrastructure equipment is attached to, or forms a part of a respective non-terrestrial network part.

Paragraph 13. A method according to paragraph 12, wherein each of the one or more non-terrestrial network part is a satellite in an orbit around the Earth.

Paragraph 14. A method according to paragraph 12 or paragraph 13, wherein estimating a timing advance valid for a transmission by a communications device at the reference time comprises determining a location of each of the one or more non-terrestrial network parts at the reference time.

Paragraph 15. A method according to any of paragraphs 1 to 14, wherein estimating the timing advance valid for the transmission by a communications device at the reference time comprises measuring a round trip time between the infrastructure equipment and the communications device.

Paragraph 16. A method according to any of paragraphs 1 to 15, the method comprising receiving the signals representing the uplink data at the infrastructure equipment.

Paragraph 17. A method of operating a communications device for transmitting signals representing uplink data to a wireless communications network via a wireless access interface, the method comprising determining a first time for transmitting the signals representing the uplink data to the wireless communications network, and transmitting at the first time on the wireless access interface signals representing the uplink data, wherein determining the first time comprises receiving a timing advance indication comprising an indication of a timing advance estimate valid at a first reference time, determining the first reference time associated with the timing advance estimate, determining the first time based on the first reference time and the timing advance estimate.

Paragraph 18. A method according to paragraph 17, wherein the timing advance indication is transmitted by an infrastructure equipment of the wireless communications network at the first reference time.

Paragraph 19. A method according to paragraph 17, wherein the first reference time is a time at which the timing advance indication is received at the communications device.

Paragraph 20. A method according to paragraph 17, wherein the timing advance indication is transmitted in accordance with a repetition scheme according to which the timing advance indication is repeatedly transmitted using a sequence of transmission instances, and the first reference time is a time at which a transmission instance of the sequence of transmission instances is received at the communications device.

Paragraph 21. A method according to any of paragraphs 17 to 20, the method comprising receiving a first reference time indication, wherein the determining the first reference time associated with the timing advance estimate is based on the first reference time indication.

Paragraph 22. A method according to paragraph 21, wherein the first reference time indication is transmitted within radio resource control, RRC, signalling.

Paragraph 23. A method according to paragraph 21, wherein the first reference time indication is transmitted within a medium access control, MAC, control element, CE.

Paragraph 24. A method according to paragraph 21, wherein the MAC CE is transmitted together with the indication of the timing advance estimate.

Paragraph 25. A method according to any of paragraphs 17 to 24, the method comprising determining a nominal transmission time for transmitting the signals, the nominal transmission time being the time for transmission of the uplink signals where no timing advance is used, wherein the determining the first time is based on the nominal transmission time.

Paragraph 26. A method according to paragraph 25, the method comprising receiving a resource allocation indication indicating uplink communication resources allocated for the transmission of the signals on the wireless access interface, wherein the determining the nominal transmission time is based on the uplink communication resources.

Paragraph 27. A method according to any of paragraphs 17 to 26, wherein the wireless communications network comprises one or more non-terrestrial infrastructure equipment, and the signals representing the uplink data are transmitted by the communications device to a first non-terrestrial infrastructure equipment of the one or more non-terrestrial infrastructure equipment.

Paragraph 28. A method according to paragraph 27, wherein each of the one or more non-terrestrial infrastructure equipment is attached to, or forms a part of a respective non-terrestrial network part.

Paragraph 29. A method according to paragraph 28, wherein each of the one or more non-terrestrial network part is a satellite in an orbit around the Earth.

Paragraph 30. A method according to any of paragraphs 16 to 29, the method comprises determining a second reference time at which a second timing advance estimate is to be valid, and estimating the second timing advance valid for a transmission by the communications device at the second reference time.

Paragraph 31. A method according to paragraph 30, wherein determining the first time is based on the second reference time and the second timing advance estimate.

Paragraph 32. A method of operating a communications device for transmitting signals representing uplink data to a wireless communications network via a wireless access interface, the method comprising determining a first time for transmitting the signals representing the uplink data to the wireless communications network, and transmitting at the first time on the wireless access interface the signals representing the uplink data, wherein determining the first time comprises receiving a timing advance indication comprising an indication of a first timing advance estimate valid at a first reference time, determining a second reference time at which a second timing advance estimate is to be valid, estimating, before the first time, the second timing advance valid for a transmission by the communications device at the second reference time, and determining the first time based on one or both of the first timing advance estimate and the second timing advance estimate.

Paragraph 33. A method according to paragraph 32, wherein determining the first time based on one or both of the first timing advance estimate and the second timing advance estimate comprises adjusting one or both of the first timing advance estimate and the second timing advance estimate based on the first reference time and the second reference time.

Paragraph 34. A method according to paragraph 32 or paragraph 33, wherein the determining the first time is based on a nominal transmission time, the nominal transmission time being the time for transmission of the uplink signals where no timing advance is used.

Paragraph 35. A method according to any of paragraphs 32 to 34, wherein the first timing advance estimate is determined based on an estimated propagation delay between an infrastructure equipment of the wireless communications network and another entity of the wireless communications network.

Paragraph 36. A method according to paragraph 35 wherein the other entity of the wireless communications network is the communications device.

Paragraph 37. A method according to paragraph 35, wherein the other entity of the wireless communications network is a non-terrestrial infrastructure equipment.

Paragraph 38. A method according to any of paragraphs 32 to 37, wherein the second timing advance estimate is determined based on an estimated propagation delay between the communications device and another entity of the wireless communications network.

Paragraph 39. A method according to paragraph 38 wherein the other entity of the wireless communications network is the infrastructure equipment.

Paragraph 40. A method according to paragraph 38, wherein the other entity of the wireless communications network is the non-terrestrial infrastructure equipment.

Paragraph 41. Infrastructure equipment for use in a wireless communications network, the infrastructure equipment providing a wireless access interface, the infrastructure equipment comprising a transmitter configured to transmit signals via the wireless access interface, a receiver configured to receive signals, and a controller configured to control the transmitter and the receiver so that the infrastructure equipment is operable to determine a reference time at which a timing advance estimate is to be valid; to estimate, before the reference time, a timing advance which is valid for a transmission by a communications device at the reference time; and to transmit a timing advance indication to the communications device indicating the timing advance which is valid for a transmission by the communications device at the reference time.

Paragraph 42. Circuitry for infrastructure equipment for use in a wireless communications network, the infrastructure equipment providing a wireless access interface, the circuitry comprising transmitter circuitry configured to transmit signals via the wireless access interface, receiver circuitry configured to receive signals, and controller circuitry configured to control the transmitter circuitry and the receiver circuitry so that the infrastructure equipment is operable to determine a reference time at which a timing advance estimate is to be valid; to estimate, before the reference time, a timing advance which is valid for a transmission by a communications device at the reference time; and to transmit a timing advance indication to the communications device indicating the timing advance which is valid for a transmission by the communications device at the reference time.

Paragraph 43. A communications device for operating in a wireless communications network, the communications device comprising a transmitter configured to transmit signals on a wireless access interface provided by an infrastructure equipment of the wireless communications network, a receiver configured to receive signals on the wireless access interface, and a controller configured to control the transmitter and the receiver so that the communications device is operable to determine a first time for transmitting the signals representing the uplink data to the wireless communications network by receiving a timing advance indication comprising an indication of a timing advance estimate valid at a first reference time, determining the first reference time associated with the timing advance estimate, and determining the first time based on the first reference time and the timing advance estimate, and to transmit at the first time on the wireless access interface signals representing the uplink data.

Paragraph 44. Circuitry for a communications device for operating in a wireless communications network, the circuitry comprising transmitter circuitry configured to transmit signals on a wireless access interface provided by an infrastructure equipment of the wireless communications network, receiver circuitry configured to receive signals on the wireless access interface, and controller circuitry configured to control the transmitter circuitry and the receiver circuitry so that the communications device is operable to determine a first time for transmitting the signals representing the uplink data to the wireless communications network by receiving a timing advance indication comprising an indication of a timing advance estimate valid at a first reference time, determining the first reference time associated with the timing advance estimate, and determining the first time based on the first reference time and the timing advance estimate, and to transmit at the first time on the wireless access interface signals representing the uplink data.

Paragraph 45. A communications device for operating in a wireless communications network, the communications device comprising a transmitter configured to transmit signals on a wireless access interface provided by an infrastructure equipment of the wireless communications network, a receiver configured to receive signals on the wireless access interface, and a controller configured to control the transmitter and the receiver so that the communications device is operable to determine a first time for transmitting the signals representing the uplink data to the wireless communications network by receiving a timing advance indication comprising an indication of a first timing advance estimate valid at a first reference time, determining a second reference time at which a second timing advance estimate is to be valid, estimating, before the first time, the second timing advance valid for a transmission by the communications device at the second reference time, and determining the first time based on one or both of the first timing advance estimate and the second timing advance estimate, and to transmit at the first time on the wireless access interface the signals representing the uplink data, wherein determining the first time comprises.

Paragraph 46. Circuitry for a communications device for operating in a wireless communications network, the circuitry comprising transmitter circuitry configured to transmit signals on a wireless access interface provided by an infrastructure equipment of the wireless communications network, receiver circuitry configured to receive signals on the wireless access interface, and controller circuitry configured to control the transmitter circuitry and the receiver circuitry so that the communications device is operable to determine a first time for transmitting the signals representing the uplink data to the wireless communications network by receiving a timing advance indication comprising an indication of a first timing advance estimate valid at a first reference time, determining a second reference time at which a second timing advance estimate is to be valid, estimating, before the first time, the second timing advance valid for a transmission by the communications device at the second reference time, and determining the first time based on one or both of the first timing advance estimate and the second timing advance estimate, and to transmit at the first time on the wireless access interface the signals representing the uplink data, wherein determining the first time comprises.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] TR 38.811 V15.4.0, "Study on New Radio (NR) to support non terrestrial networks (Release 15)", 3rd Generation Partnership Project, October 2020.
[2] Holma H. and Toskala A, "LTE for UMTS OFDMA and SC-FDMA based radio access", John Wiley and Sons, 2009.
[3] TR 38.821 V16.0.0, "Solutions for NR to support Non-Terrestrial Networks (NTN)" 3rd Generation Partnership Project, January 2020.
[4] 3GPP document R1-2005496 "UL Time and Frequency Synchronisation for NR-NTN", MediaTek, Eutelsat, 3GPP
[5] EP application EP21151456.7

What is claimed is:

1. A method of operating an infrastructure equipment of a wireless communications network, the method comprising:

determining a future reference time at which a timing advance estimate is to be valid;

estimating, before the future reference time, a timing advance which is valid for a transmission by a communications device at the future reference time; and transmitting a timing advance indication to the communications device indicating the timing advance which is valid for a transmission by the communications device at the future reference time, wherein the timing advance indication enables the communications device to determine an actual transmission time by estimating a change in propagation delay occurring during a time period defined by a difference between the future reference time and a nominal transmission time.

2. The method according to claim 1, wherein:
the timing advance indication is transmitted at the future reference time.

3. The method according to claim 1, wherein:
the future reference time is a time at which the timing advance indication is received at the communications device.

4. The method according to claim 1, wherein:
the timing advance indication is transmitted in accordance with a repetition scheme according to which the timing advance indication is repeatedly transmitted using a sequence of transmission instances, and
the future reference time is a time at which a particular transmission instance of the sequence of transmission instances is received at the communications device.

5. The method according to claim 1, wherein:
the future reference time is a time of transmission of an instance of a sequence of transmissions of uplink data in accordance with a repetition scheme.

6. The method according to claim 1, the method further comprising:
transmitting a reference time indication for allowing the communications device to determine the future reference time.

7. The method according to claim 1, the method further comprising:
transmitting a resource allocation indication, indicating communication resources allocated to the communications device for the transmission of signals.

8. The method according to claim 1, the method further comprising:
transmitting a selection indication, indicating that the communications device is to determine a timing advance to be used for the transmission of signals based on the timing advance indicated by the timing advance indication, irrespective of a timing advance estimate determined at the communications device.

9. The method according to claim 1, the method further comprising:
transmitting a selection indication, indicating that the communications device is to determine a timing advance to be used for the transmission of signals based on the timing advance indicated by the timing advance indication and a timing advance estimate determined at the communications device.

10. The method according to claim 1, wherein:
the wireless communications network comprises one or more non-terrestrial infrastructure equipment, and
signals representing uplink data are transmitted by a first non-terrestrial infrastructure equipment of the one or more non-terrestrial infrastructure equipment.

11. The method according to claim 10, wherein:
the infrastructure equipment is one of the one or more non-terrestrial infrastructure equipment.

12. The method according to claim 10, wherein:
each of the one or more non-terrestrial infrastructure equipment is attached to, or forms a part of a respective non-terrestrial network part.

13. The method according to claim 12, wherein:
each of the one or more non-terrestrial network parts is a satellite in an orbit around the Earth.

14. The method according to claim 12, wherein:
estimating a timing advance valid for a transmission by a communications device at the future reference time comprises determining a location of each of the one or more non-terrestrial network parts at the future reference time.

15. The method according to claim 1, wherein:
estimating the timing advance valid for the transmission by a communications device at the future reference time comprises measuring a round trip time between the infrastructure equipment and the communications device.

16. The method according to claim 1, the method further comprising:
receiving signals representing uplink data at the infrastructure equipment.

17. The method of claim 1, wherein the wireless communications network comprises a non-terrestrial network part, and wherein estimating the timing advance comprises:
determining a location of the non-terrestrial network part at the future reference time based on ephemeris information; and
estimating a propagation delay between the infrastructure equipment and the communications device at the future reference time based on the determined location.

18. Infrastructure equipment for use in a wireless communications network, the infrastructure equipment providing a wireless access interface, the infrastructure equipment comprising:
a transmitter to transmit signals via the wireless access interface,
a receiver to receive signals, and
circuitry configured to control the transmitter and the receiver so that the infrastructure equipment is operable
to determine a future reference time at which a timing advance estimate is to be valid;
to estimate, before the future reference time, a timing advance which is valid for a transmission by a communications device at the future reference time; and
to transmit a timing advance indication to the communications device indicating the timing advance which is valid for a transmission by the communications device at the future reference time, wherein
the timing advance indication enables the communications device to determine an actual transmission time by estimating a change in propagation delay occurring during a time period defined by a difference between the future reference time and a nominal transmission time.

19. A communications device for operating in a wireless communications network, the communications device comprising:
a transmitter to transmit signals on a wireless access interface provided by an infrastructure equipment of the wireless communications network;
a receiver to receive signals on the wireless access interface; and
circuitry configured to control the transmitter and the receiver so that the communications device is operable
to determine a first time for transmitting the signals representing uplink data to the wireless communications network by receiving a timing advance indication comprising an indication of a timing advance estimate valid at a future first reference time, determining the future first reference time associated with the timing advance estimate, determining a second time corresponding to a nominal transmission time for the signals, and determining the first time based on the future first reference time and the timing advance estimate, and to transmit at the first time on the wireless access interface signals representing the uplink data, wherein determining the first time comprises estimating a change in propagation delay occurring during a time period defined by a difference between the future first reference time and the second time.

20. The communications device of claim 19, wherein the circuitry is further configured to adjust the timing advance estimate by:

calculating a timing drift rate associated with downlink reference signals from the infrastructure equipment;

determining a location of a non-terrestrial network part at the second time based on ephemeris information; and estimating the change in propagation delay between the future first reference time and the second time based on the calculated timing drift rate and the determined location.

* * * * *